United States Patent [19]
Choi

[11] Patent Number: 5,835,150
[45] Date of Patent: Nov. 10, 1998

[54] IMAGE FORMAT CONVERTER FOR HDTV

[75] Inventor: Jong Sik Choi, Seoul, Rep. of Korea

[73] Assignee: LG Electronics Inc., Seoul, Rep. of Korea

[21] Appl. No.: 544,877

[22] Filed: Oct. 18, 1995

[30] Foreign Application Priority Data

Oct. 20, 1994 [KR]  Rep. of Korea ...................... 94/26832

[51] Int. Cl.⁶ .............................. H04N 7/01; H04N 11/20
[52] U.S. Cl. .......................... 348/441; 348/443; 348/446; 348/448
[58] Field of Search ................................... 348/441, 443, 348/445, 446, 448, 458, 459, 555, 556, 558; H04N 7/01, 7/08, 11/20

[56] References Cited

U.S. PATENT DOCUMENTS

| | | | |
|---|---|---|---|
| 5,138,659 | 8/1992 | Kelkar et al. | 348/441 |
| 5,444,491 | 8/1995 | Lim | 348/441 |
| 5,457,499 | 10/1995 | Lim | 348/474 |
| 5,485,216 | 1/1996 | Lee | 348/443 |
| 5,497,199 | 3/1996 | Asada et al. | 348/446 |

*Primary Examiner*—Michael H. Lee
*Attorney, Agent, or Firm*—John P. White; Cooper & Dunham LLP

[57] ABSTRACT

An image format converter for an HDTV is disclosed including a decoder for decoding transmitted data to thereby output video data, image format information, picture structure information, an input frequency sync signal, an input vertical sync signal, and an input line sync signal; a sync signal generator for outputs a display line sync signal, display vertical sync signal, process line sync signal, and process vertical sync signal, according to the input image format and displayed image format, using the image format information and the input frequency sync signal output from the decoder, a display format signal externally input in accordance with the display format, and an externally input reference clock; and a format converter for converting the input video signal into a sequential scanning mode of 60 Hz frame rate or an interlaced scanning mode of 60 Hz frame rate, using the information values output from the decoder and sync signal generator.

52 Claims, 28 Drawing Sheets

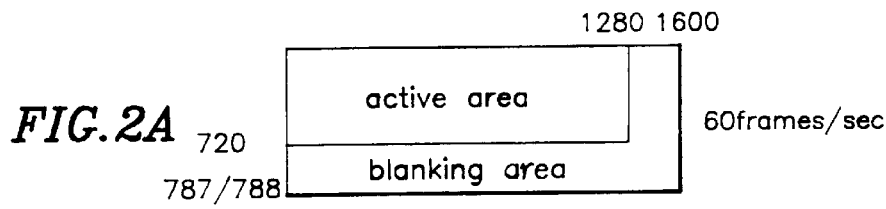
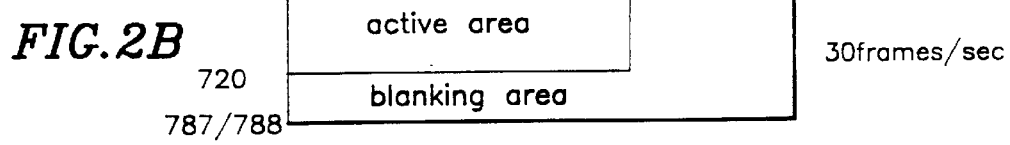
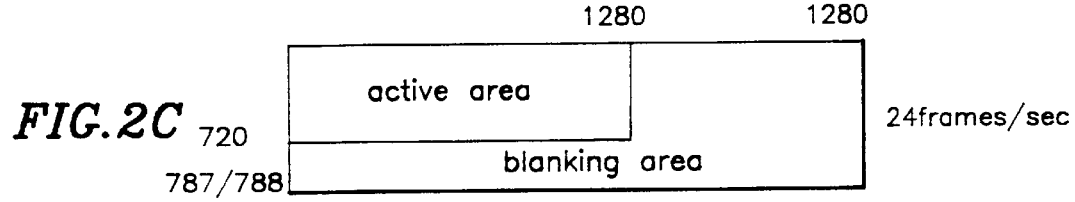
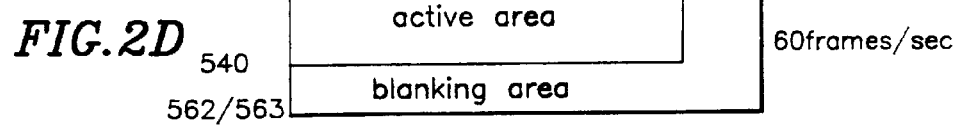
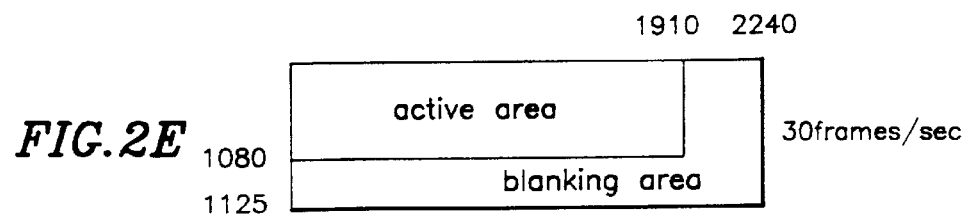
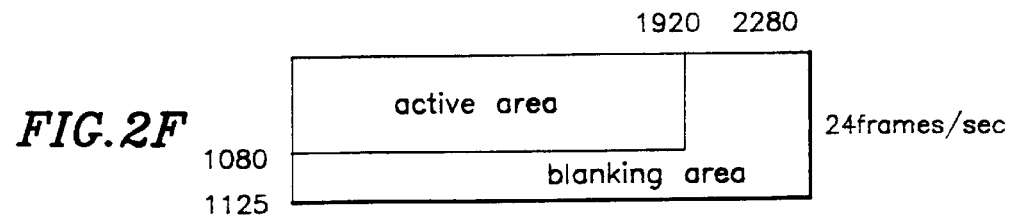

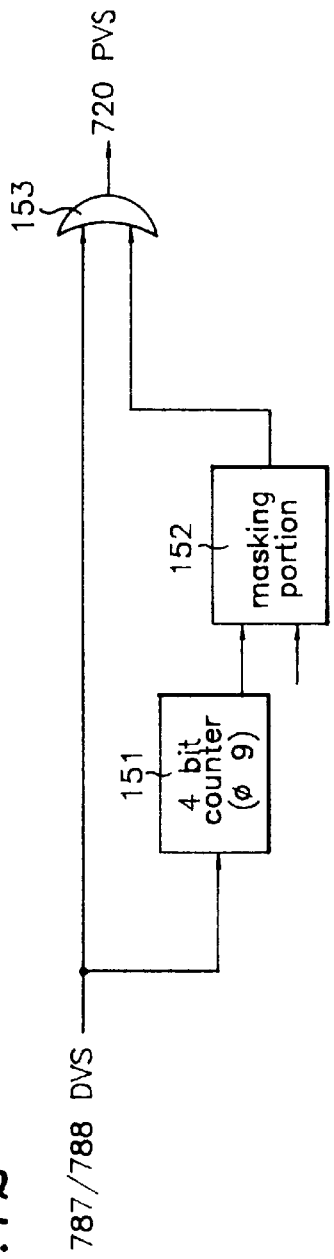

IFS

787/788DVS 4-bit counter 720 masking portion

720 PVS

A 720 masking portion

720 PVS

B 720 masking portion

720 PVS

C 720 masking portion

720 PVS

D,E,F

A,B,C

D,E

F

F I G. 17

| FORMAT INFORMATION | COUNTER | OUTPUT |
|---|---|---|
| A,B,C | don't care | ∅ |
| D,E | don't care | 1 |
| F | ∅,5 | ∅ |
| F | 1,2,3,4,5,6,7,8,9 | 1 |

F I G. 18

| FORMAT INFORMATION | COUNTER | OUTPUT |
|---|---|---|
| A,B,C | don't care | ∅ |
| D,E | odd | ∅ |
| D,E | even | 1 |
| F | ∅,5 | ∅ |
| F | 1,2,3,4,5,6,7,8,9 | 1 |

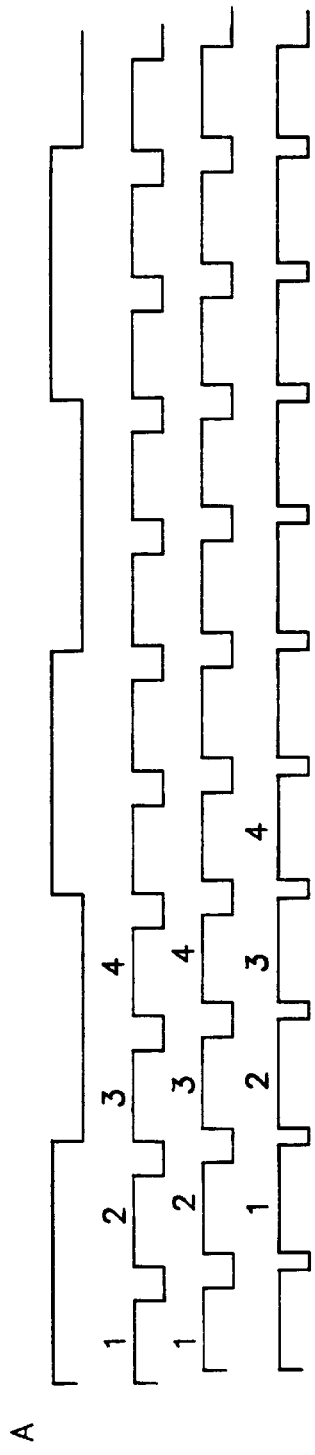
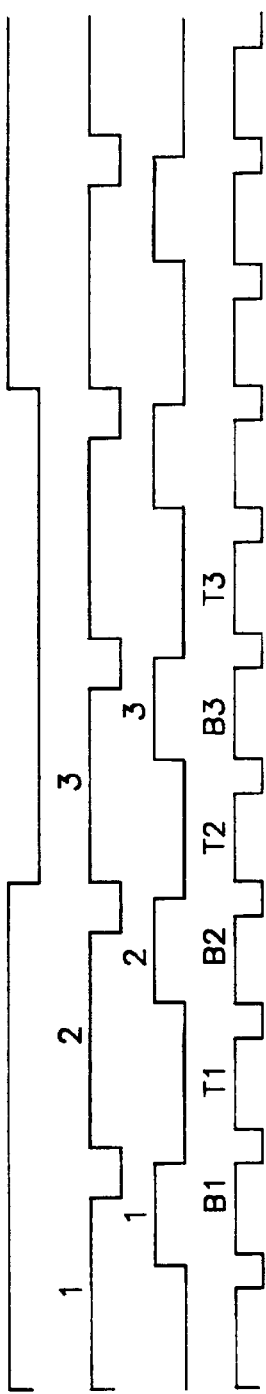
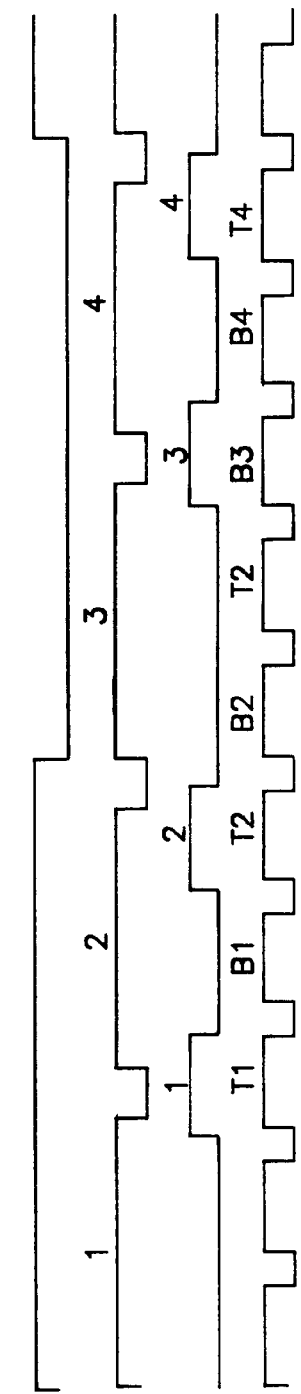

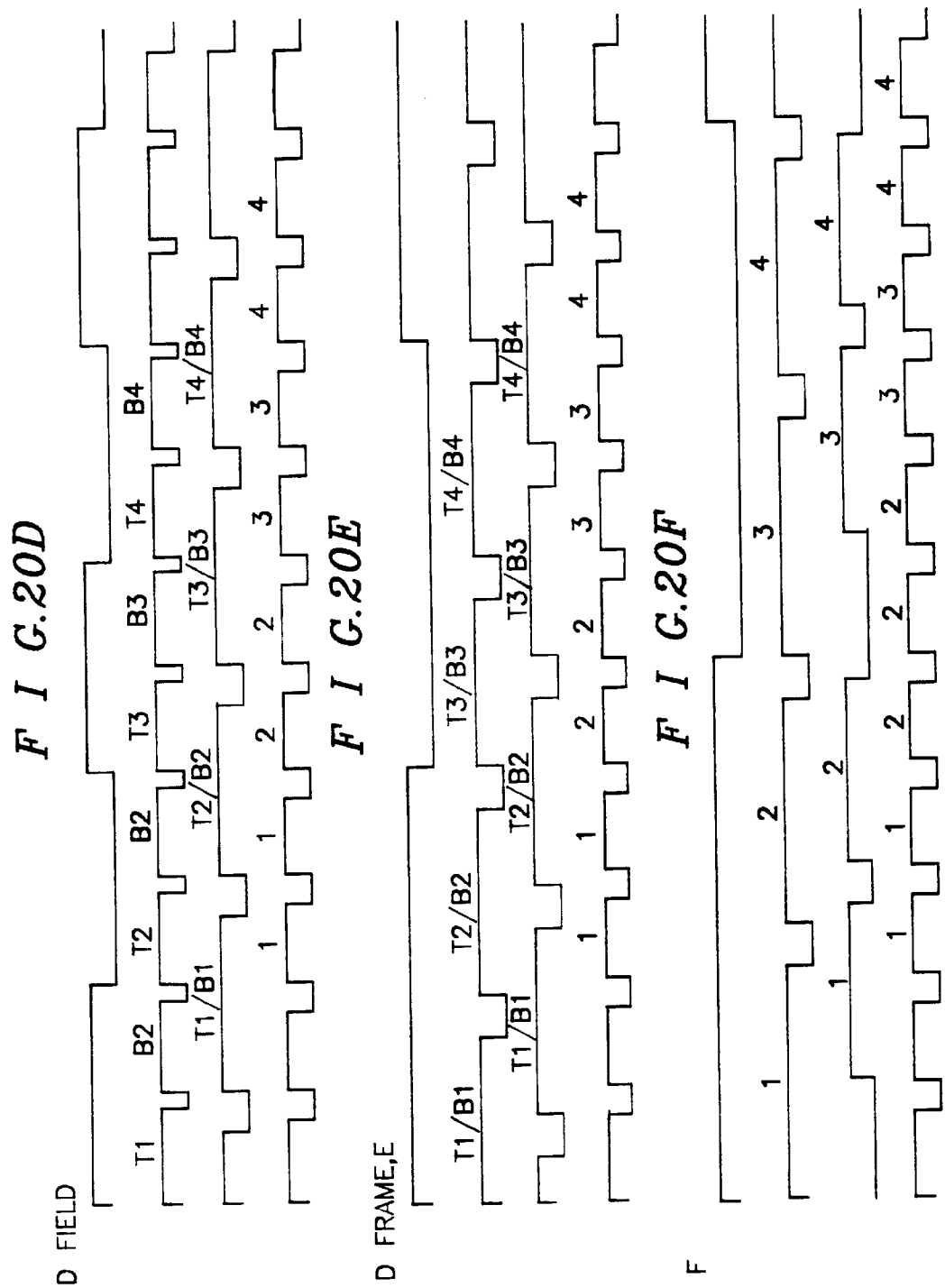

FIG.21
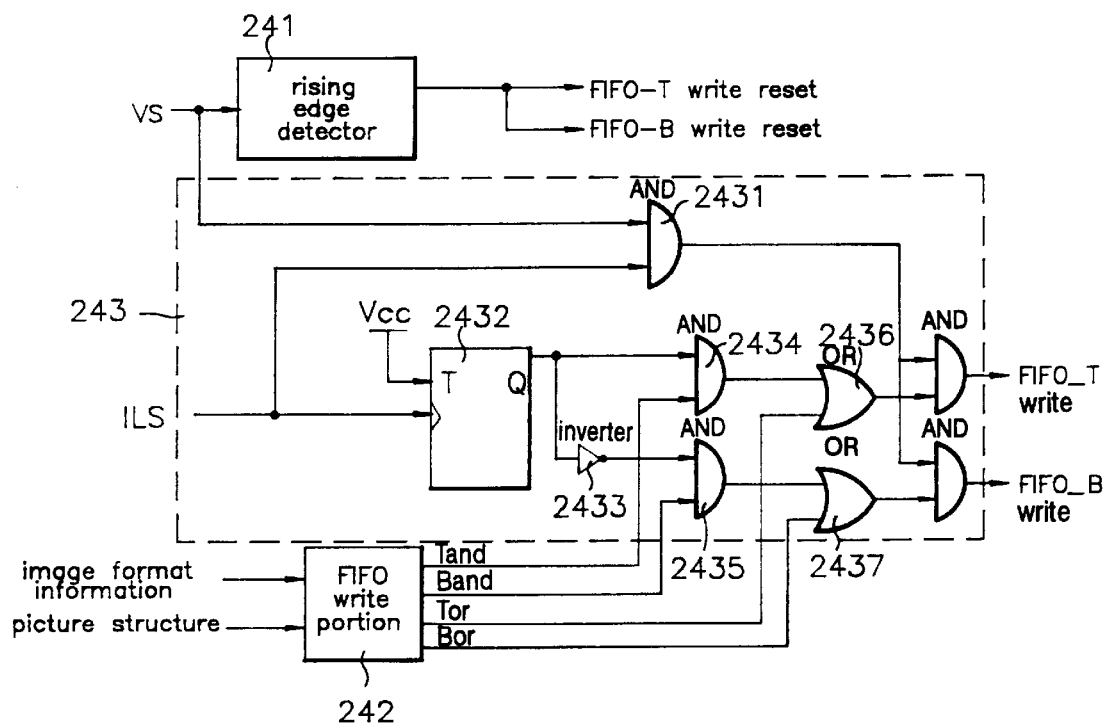
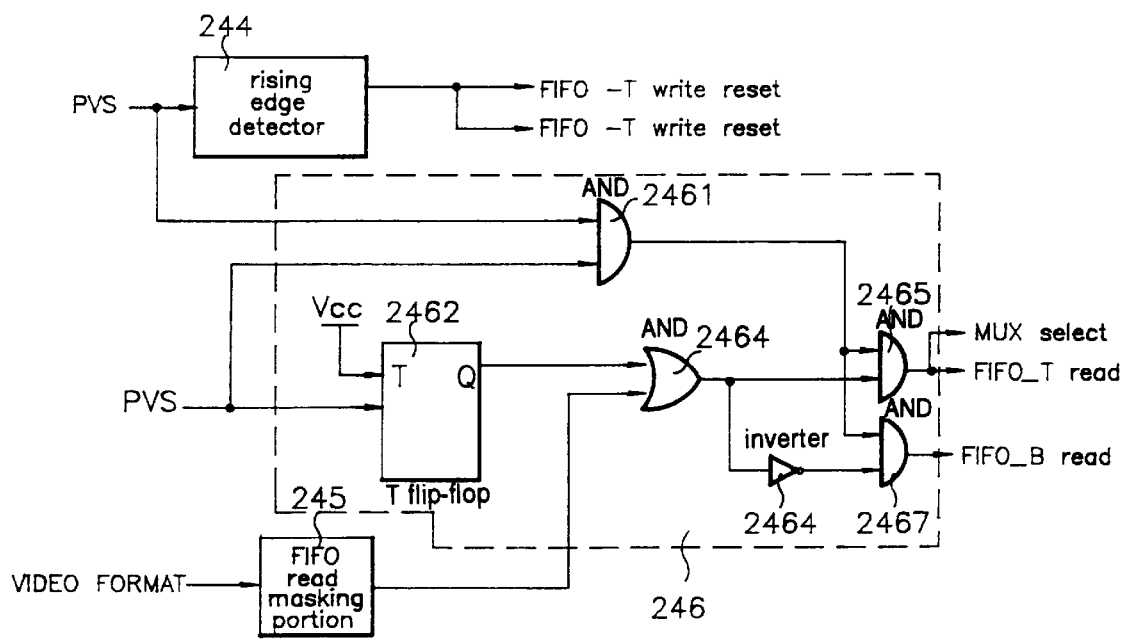

| format | picture structure | tard | tar | bard | bar |
|---|---|---|---|---|---|
| A | don't care | 1 | 1 | 0 | 0 |
| B | don't care | 1 | 1 | 0 | 0 |
| C | don't care | 1 | 1 | 0 | 0 |
| D | top field | 1 | 1 | 0 | 0 |
| D | bottom field | 0 | 0 | 1 | 1 |
| D | frame structure | 1 | 0 | 1 | 0 |
| E | don't care | 1 | 0 | 1 | 0 |
| F | don't care | 1 | 0 | 1 | 0 |

| format | output |
|---|---|
| A,B,C | 1 |
| D,E,F | 0 |

| format | prog | output |
|---|---|---|
| A,B,C,E,F | don't care | 1 |
| D | A,B,C | 1 |
| D | D,E,F | 0 |

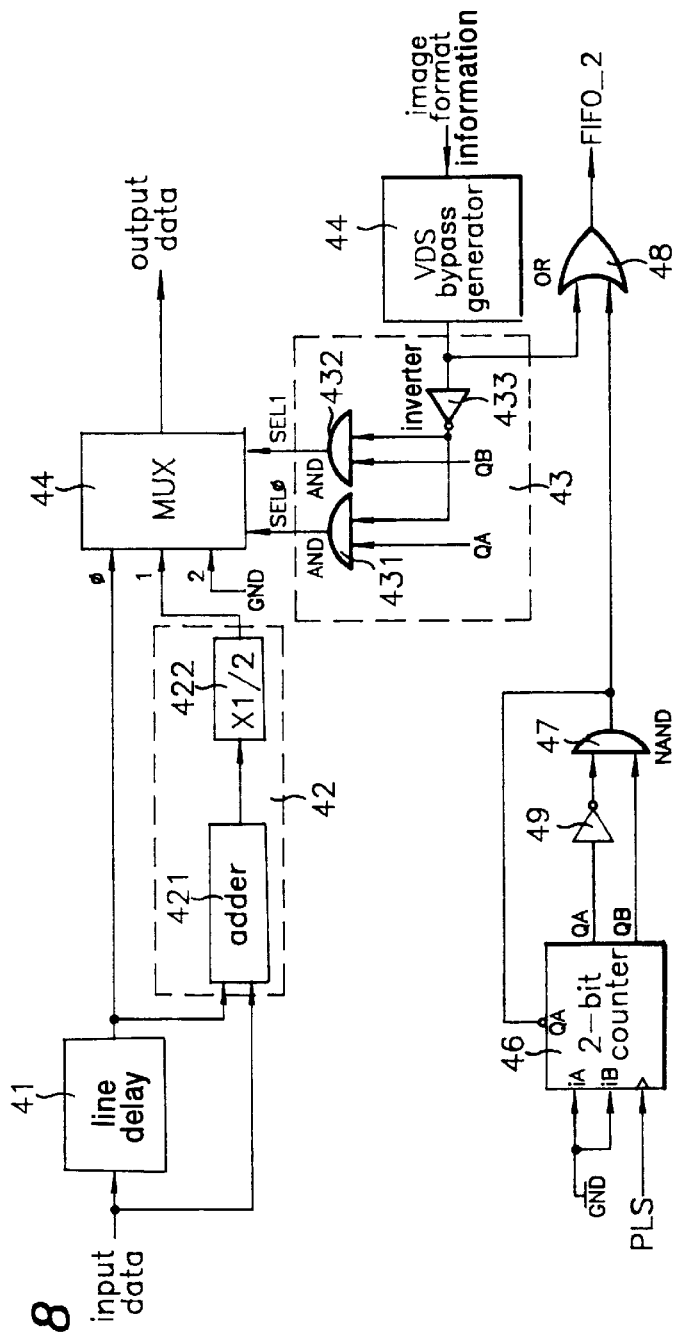
F I G.28
F I G.29

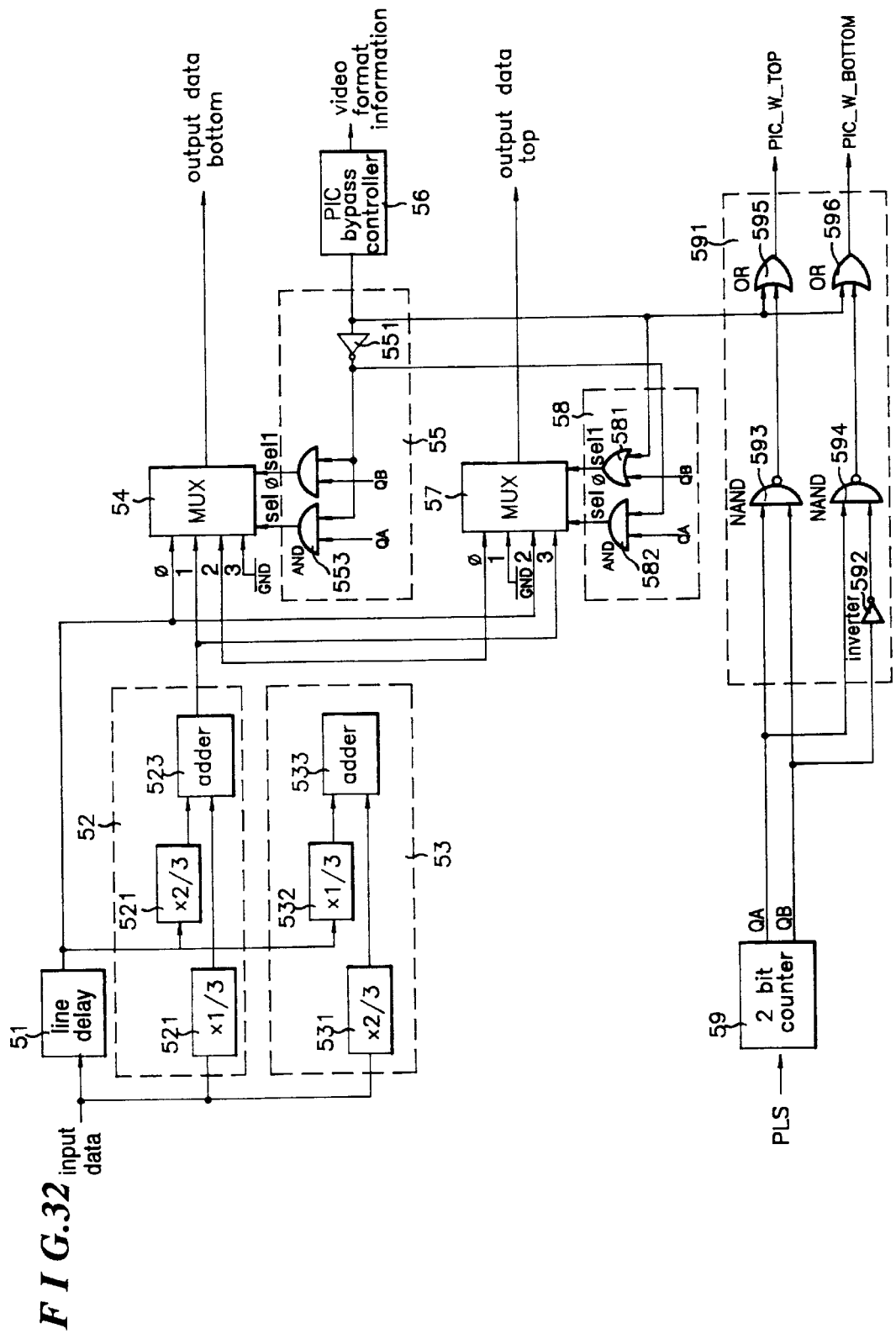
F I G. 32

| FORMAT | OUTPUT |
|--------|--------|
| A,B,C  | 0      |
| D,E,F  | 1      |

| INPUT LINE | | OUTPUT LINE |
|---|---|---|
| X1 | → | X1'=1 |
| 2X | → | X1''=(1+2×2)/3 |
|  | → | X2'=2.2+3/3 |
| 3X | → | X2''=3 |
| 4X | → | X3'=3+2.4/3 |
|  | → | X3''=(2×4+5)/3 |
| 5X | → | X4'=5 |
| 6X | → | X4''=(5+2×6)/3 |
| 7X | → | X |

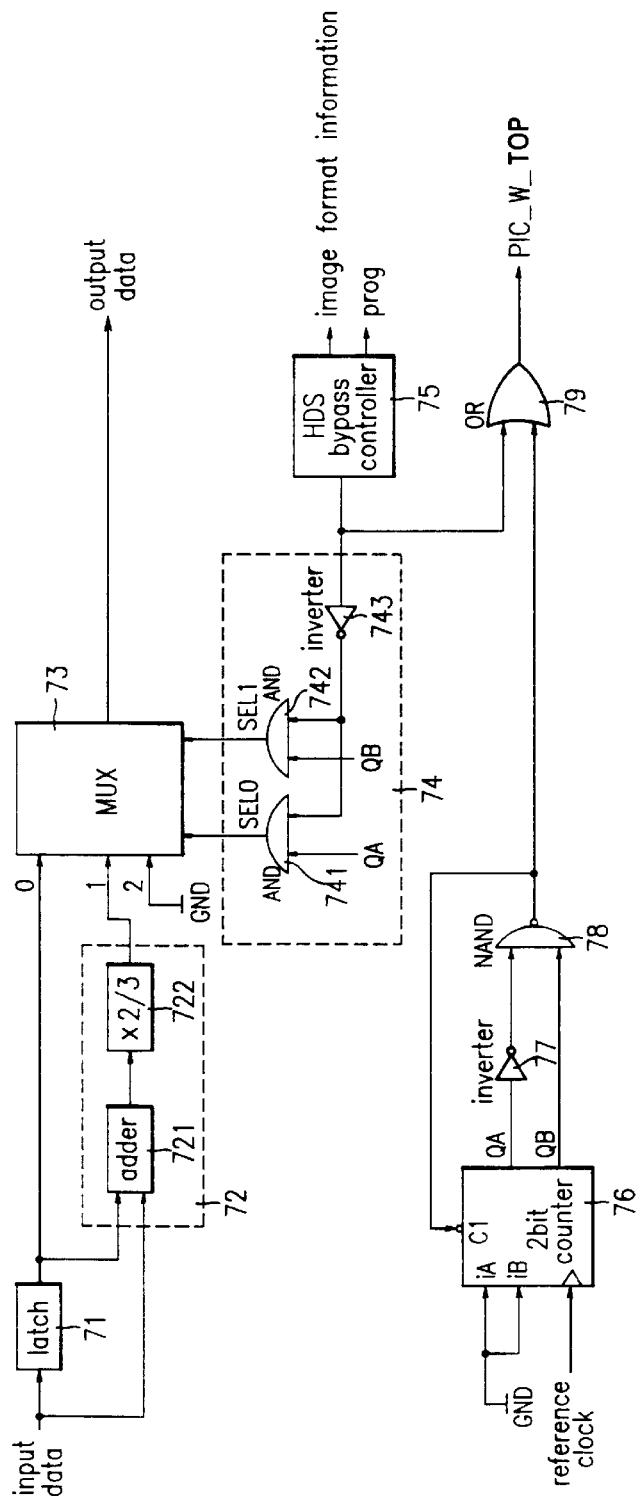

F I G. 38
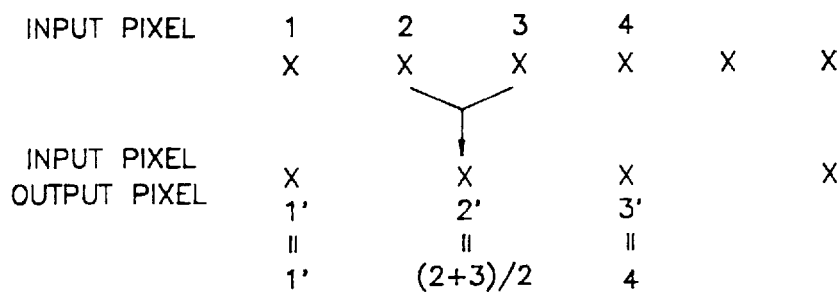
F I G. 39
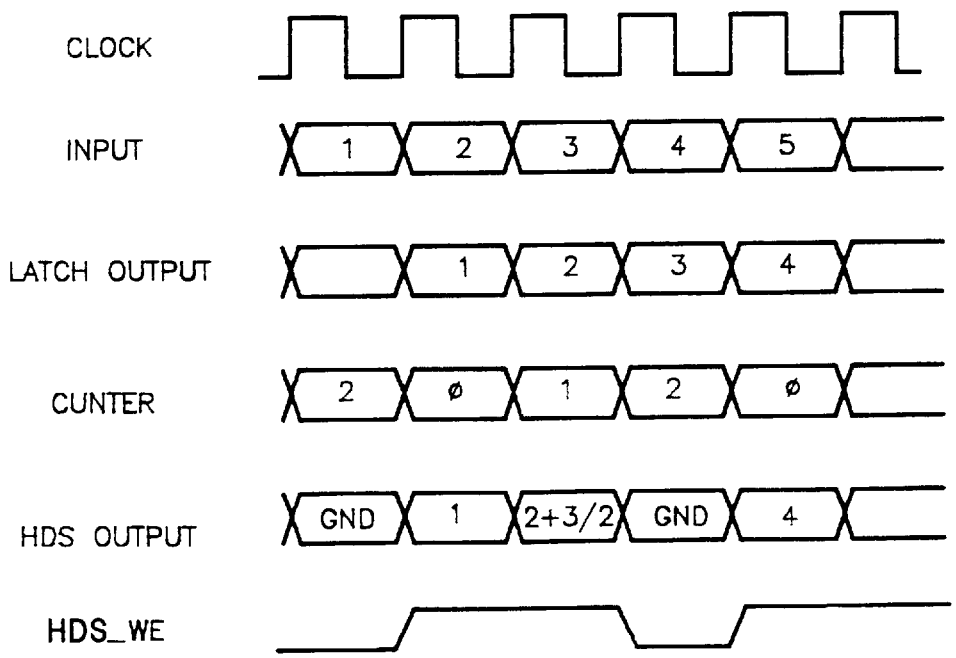

F I G.40
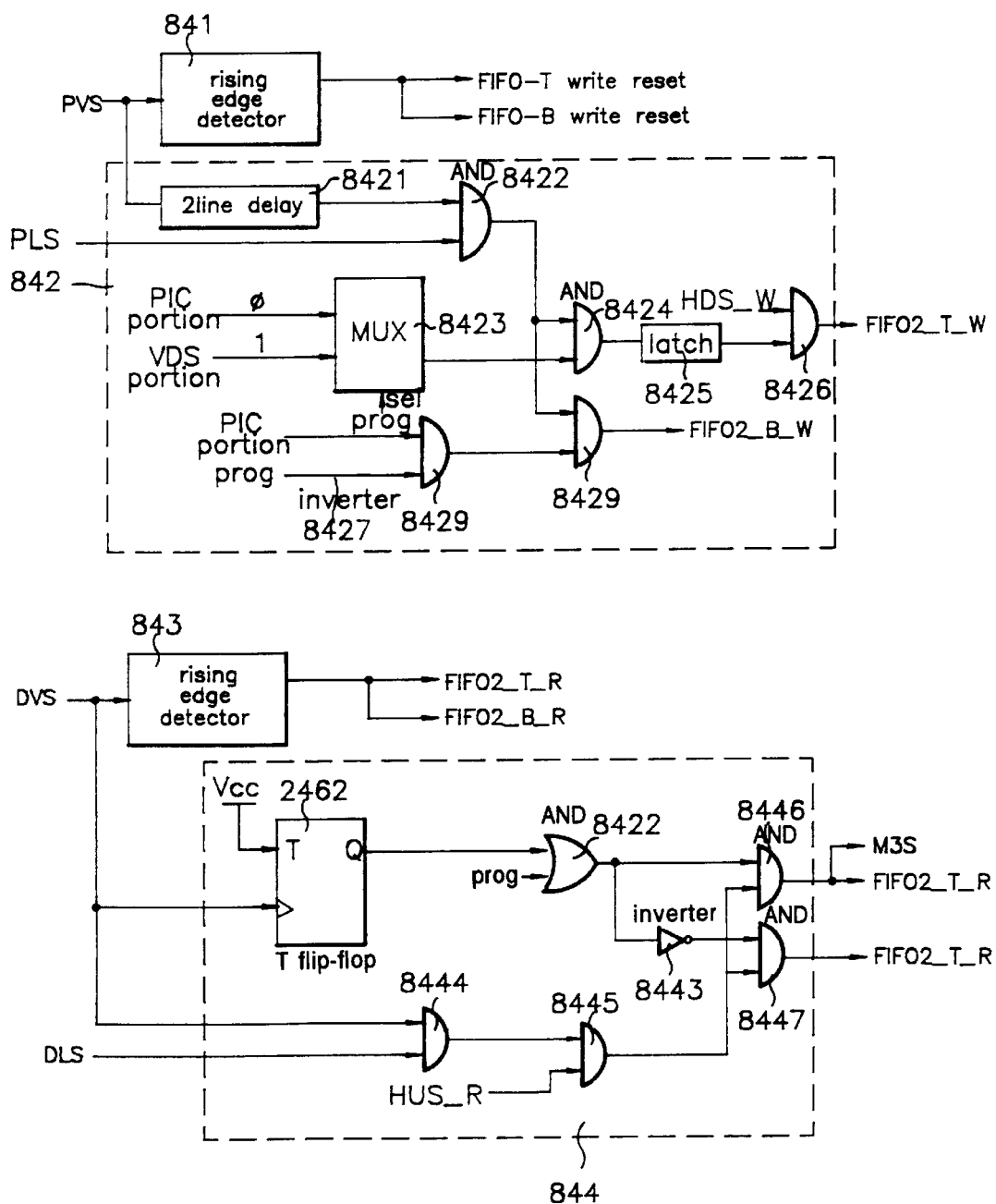

FIG. 42
| FORMAT | PROG | OUTPUT |
|--------|------|--------|
| A,B,C  | ∅    | ∅      |
| A,B,C  | 1    | 1      |
| D,E,F  | don't care | 1 |
FIG. 43
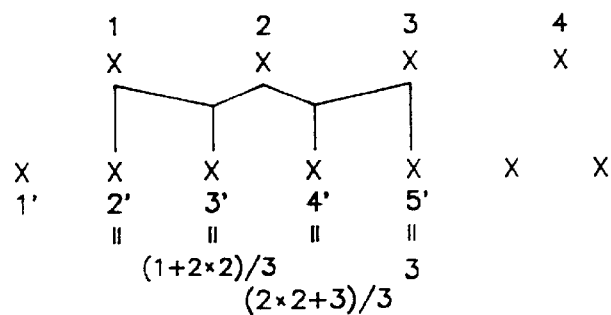
FIG. 44
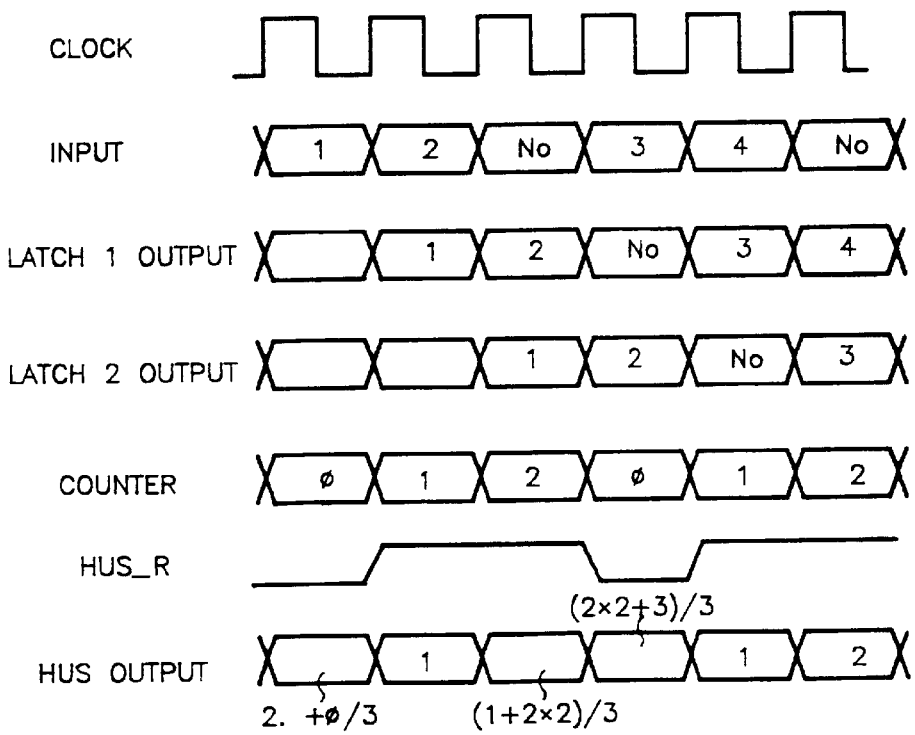

IMAGE FORMAT CONVERTER FOR HDTV

BACKGROUND OF THE INVENTION

The present invention relates to an image format converter for HDTV, and more particularly, to an image format converter for HDTV for converting an image format using only a single clock.

A conventional image format converter uses several kinds of clock in order to convert an image format into a different format. However, this increases a burden of a clock generating device. Interference between the clocks undesirably acts as noise to the whole system.

SUMMARY OF THE INVENTION

Therefore, it is an object of the present invention to provide an image format converter for converting the image format of a video signal using a single clock.

To accomplish the object of the present invention, there is provided an image format converter for an HDTV comprising: a decoder for decoding transmitted data to thereby output video data, image format information, picture structure information, an input frequency sync signal, an input vertical sync signal, and an input line sync signal; a sync signal generator for outputs a display line sync signal, display vertical sync signal, process line sync signal, and process vertical sync signal, according to the input image format and displayed image format, using the image format information and the input frequency sync signal output from the decoder, a display format signal externally input in accordance with the display format, and an externally input reference clock; a blanking area converter for receiving the video data, image format information and picture structure information output from the decoder, using the process line sync signal and process vertical sync signal output from the sync signal generator, to thereby convert the blanking area of an image format; an IPC portion for converting the video signal output from the blanking area converter into a video signal of a sequential scanning mode, according to the process line sync signal output from the sync signal generator and the image format and display format output from the decoder; a VDS portion for vertically sampling down the video signal output from the IPC portion by 3:2 in order to convert it into a corresponding image format information, using the process line sync signal output from the sync signal generator and the image format information output from the decoder; a PIC portion for converting the video signal output from the IPC portion into a video signal of interlaced scanning mode, according to the process line sync signal output from the sync signal generator and the image format output from the decoder; a first multiplexer for selecting and outputting one of the video signals output from the VDS portion and IPC portion according to a display format; an HDS portion for horizontally sampling down the video signal output from the first multiplexer by 3:2 in order to convert it into a corresponding image format information, according to the image format and display format information output from the decoder; a frame rate converter for converting the frame rate of the video signal output from the HDS portion into 60 Hz according to the image format and display format output from the decoder, using the process line sync signal, process vertical sync signal, display line sync signal, and display vertical sync signal output from the sync signal generator, and control signals output from the VDS portion, PIC portion, and HDS portion; and an HUS portion for horizontally sampling up the video signal output from the frame rate converter according to the display format.

BRIEF DESCRIPTION OF THE ATTACHED DRAWINGS

FIGS. 2A–2F show the structures of an image signal in the image format of the present invention;

FIG. 12 is a detailed circuit diagram of the 720 process vertical sync signal (PVS) generator of FIG. 4;

FIG. 13 shows operation states of the 720 masking portion of FIG. 12;

FIG. 17 shows operation states of the 1080 masking portion of FIG. 15;

FIG. 18 shows operation states of the 1080 clear masking portion of FIG. 15;

FIGS. 20A–20F are waveform diagrams of sync signals corresponding to the respective image formats in an interlaced scanning display mode;

FIG. 21 is a detailed circuit diagram of the controller of FIG. 1;

FIG. 28 is a detailed circuit diagram of the VDS portion of FIG. 1;

FIG. 29 shows operation states of the VDS bypass controller of FIG. 28;

FIG. 32 is a detailed circuit diagram of the PIC portion of FIG. 1;

FIG. 36 is a detailed circuit diagram of the HDS portion of FIG. 1;

FIG. 37 shows operation states of the HDS bypass controller of FIG. 36;

FIG. 38 shows the image data processing state of FIG. 36;

FIG. 39 shows signal waveforms present at the respective portions of FIG. 36;

FIG. 40 is a detailed circuit diagram of the controller of FIG. 1;

FIG. 42 shows operation states of the HUS bypass controller of FIG. 41;

FIG. 43 shows the image data processing state of FIG. 41; and

FIG. 44 shows signal waveforms present at the respective portions of FIG. 41.

DETAILED DESCRIPTION OF THE INVENTION

Hereinafter, a preferred embodiment of the present invention will be described with reference to the attached drawings.

Figure 1:
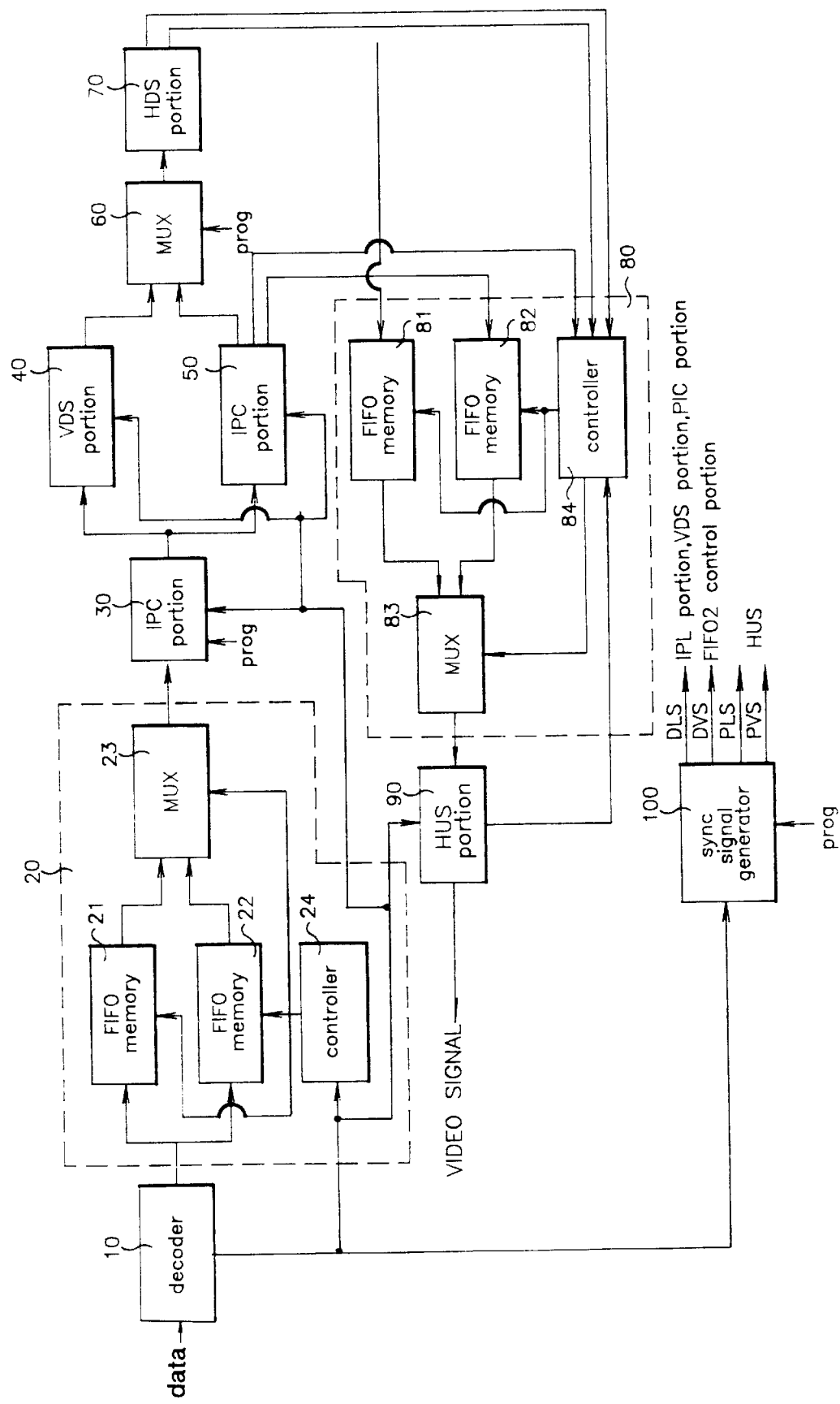
FIG. 1 is a block diagram of an image format converter of the present invention.
Figure 3A:
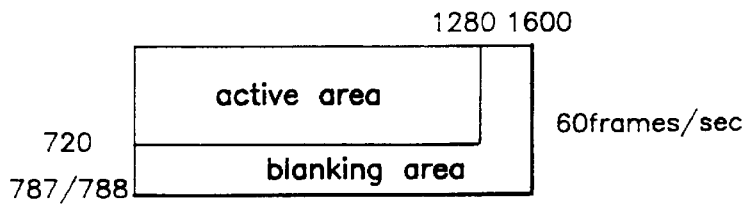
FIGS. 3A–3F show the structures of an image signal output from the blanking area converting portion of FIG. 1.
Figure 3B:
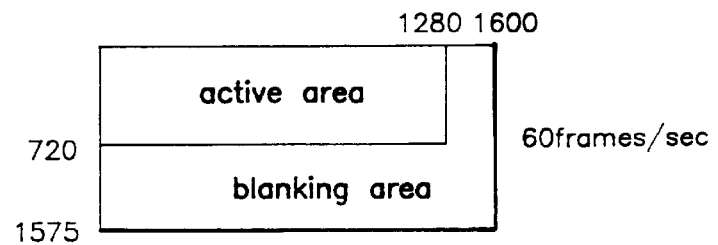
Figure 3C:
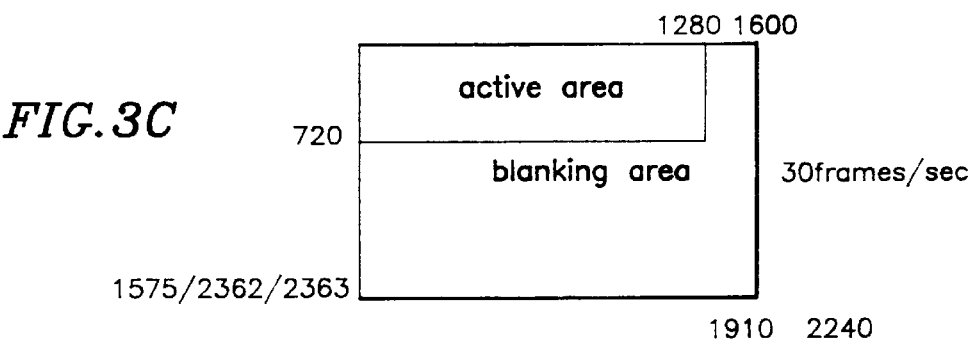
Figure 3D:
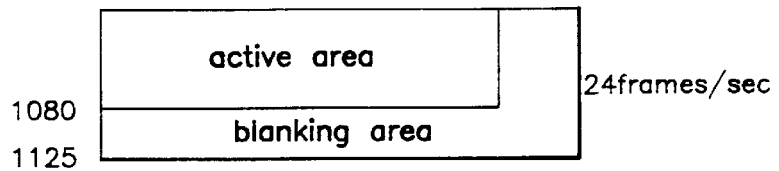
Figure 3E:
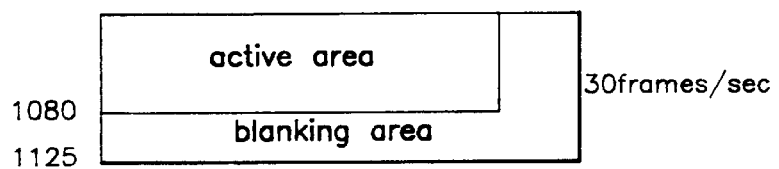
Figure 3F:
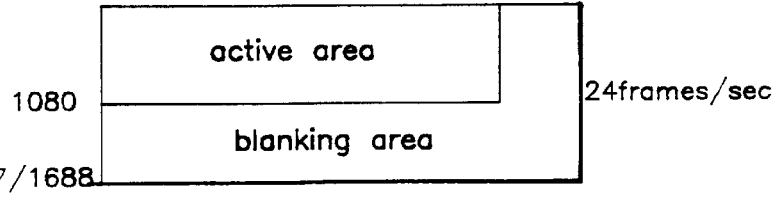

Referring to FIG. 1, an image format converter of the present invention comprises a decoder 10, blanking area converting portion 20, interlace to progressive converting (IPC) portion 30, vertical down sampling (VDS) portion 40, progressive to interlace converting (PIC) portion 50, multiplexer 60, horizontal down sampling (HDS) portion 70, frame rate converting portion 80, horizontal up sampling (HUS) portion 90, and sync signal generating portion 100.

Decoder 10 decodes transmitted data to thereby output video data, image format information, picture structure information, input frequency sync signal (IFS), input vertical sync signal (IVS), and input line sync signal (ILS). Here, input frequency sync signal IFS is one having four times the frequency input vertical sync signal IVS.

Sync signal generator 100 outputs a display line sync signal DLS, display vertical sync signal DVS, process line sync signal PLS, and process vertical sync signal PVS, according to the input image format and displayed image format, using the image format information and input frequency sync signal IFS output from decoder 10, a display format signal prog externally input in accordance with the display format, and an externally input reference clock.

Blanking area converting portion 20 comprises a FIFO memory 21 for temporarily storing data corresponding to the top field out of the video data output from decoder 10, FIFO memory 22 for temporarily storing data corresponding to the bottom field out of the video data output from decoder 10, multiplexer 23 for multiplexing the signals output from FIFO memories 21 and 22, and outputting the result to IPC portion 30, and a controller 24 for receiving the image format information and picture structure information output from decoder 10 to thereby control FIFO memories 21 and 22 and multiplexer 23, using process line sync signal PLS and process vertical sync signal PVS output from sync signal generator 100. Using process line sync signal PLS and process vertical sync signal PVS output from sync signal generator 100, the blanking area converting portion receives the video data, image format information and picture structure information output from decoder 10, converting the blanking area of the image format.

IPC portion 30 converts the video signal output from blanking area converting portion 20 into a video signal of sequential scanning, according to process line sync signal PLS output from sync signal generator 100 and the image format and display format output from decoder 10.

VDS portion 40 vertically samples down the video signal output from IPC 30 by 3:2 in order to convert it into a corresponding image format information, using process line sync signal PLS output from sync signal generator 100 and the image format information output from decoder 10.

PIC portion 50 converts the video signal output from IPC portion 30 into a video signal of interlaced scanning, according to process line sync signal PLS output from sync signal generator 100 and the image format output from decoder 10.

Multiplexer 60 selects and outputs one of the video signals output from VDS portion 40 and IPC portion 50 according to a display format.

HDS portion 70 horizontally samples down the video signal output from multiplexer 60 by 3:2 in order to convert it into a corresponding image format information, according to the image format and display format information output from decoder 10.

Frame rate converting portion 80 comprises a FIFO memory 81 for temporarily storing data corresponding to the top field out of the video data output from HDS portion 70, FIFO memory 82 for temporarily storing data corresponding to the bottom field out of the video data output from HDS portion 70, multiplexer 83 for multiplexing the signals output from FIFO memories 81 and 82, and outputting the result to HUS portion 90, and a controller 84 for controlling FIFO memories 81 and 82 and multiplexer 83 according to the image format and display format output from decoder 10, using process line sync signal PLS, process vertical sync signal PVS, display line sync signal DLS, and display vertical sync signal DVS output from sync signal generator 100, and the control signals output from VDS portion 40, PIC portion 50, and HDS portion 70. Using process line sync signal PLS, process vertical sync signal PVS, display line sync signal DLS, and display vertical sync signal DVS output from sync signal generator 100, and the control signals output from VDS portion 40, PIC portion 50, and HDS portion 70, the frame rate converting portion 80 converts the frame rate of the video signal output from HDS portion 70 according to the image format and display format output from decoder 10. Here, in case that the display format is sequential scanning mode in accordance with the externally input display format prog, only one FIFO memory is used.

HUS portion 90 horizontally samples up the video signal output from frame rate converting portion 80 by 2:3 according to the display format. The result is output to a monitor. The operation of the image format converter of the present invention will be explained below.

Input data is decoded in decoder 10 to be output as video data, image format information, picture structure information, input frequency sync signal IFS, input vertical sync signal IVS, and input line sync signal ILS.

The image format information of a video signal and input frequency sync signal IFS output from decoder 10, display format signal prog externally input according to the display format, and an externally input reference clock is input to sync signal generator 100, generating display line sync signal DLS, display vertical sync signal DVS, process line sync signal PLS, and process vertical sync signal PVS according to the input image format and display image format.

The video data output from decoder 10 is input to blanking area converting portion 20, and therefore the blanking area of the image format is converted according to the image format information and picture structure information output from decoder 10, and process line sync signal PLS and process vertical sync signal PVS output from sync signal generator 100.

The video data output from decoder 10 is made up of an active area and blanking area, which will be described in detail with reference to FIGS. 2A–2F.

For the image format of a video signal output from decoder 10, there are a sequential scanning image format A having a frame rate of 60 Hz and made up of a video signal of 787/788 lines×1600 pixels containing an active area of 720 lines×1280 pixels, a sequential scanning image format B having a frame rate of 30 Hz and made up of a video signal of 787/788 lines×3200 pixels containing an active area of 720 lines×1280 pixels, a sequential scanning image format C having a frame rate of 24 Hz and made up of a video signal of 787/788 lines×4000 pixels containing an active area of 720 lines×1280 pixels, an interlaced scanning image format D having a field rate of 60 Hz and made up of a video signal of 562/563 lines×2240 pixels containing an active area of 540 lines×1910 pixels, or having a frame rate of 30 Hz and made up of a video signal of 1125 lines×2240 pixels containing an active area of 1080 lines×1920 pixels, a sequential scanning image format E having a frame rate of 30 Hz and made up of a video signal of 1125 lines×2240 pixels containing an active area of 1080 lines×1910 pixels, and a sequential scanning image format F having a frame rate of 24 Hz and made up of a video signal of 1125 lines×2280 pixels containing an active area of 1080 lines× 1910 pixels. Here, in the image signals made in image formats A–F, the remainders excluding the active areas become their blanking areas.

Blanking area converting portion 20 converts the blanking area of the video signal in the respective image formats A–F, using FIFO memories 21 and 22, as shown in FIGS. 3A–3F. The result is output to IPC portion 30.

More specifically, blanking area converting portion 20 converts a video signal formed in image format A made up of 787/788 lines×3200 pixels into a video signal B' made in an image format made up of 1575 lines×1600 pixels having an active area of 720 lines×1280 pixels in order to change its blanking area, a video signal formed in image format C made up of 787/788 lines×4000 pixels into a video signal C' made in an image format made up of 1575/2362/2363 lines×1600 pixels having an active area of 720 lines×1280 pixels in order to change its blanking area, a video signal formed in image format D made up of 562/563 lines×2240 pixels into a video signal D' made in an image format made up of 1125 lines×2240 pixels having an active area of 1080 lines×1920 pixels in order to change its blanking area, and a video signal formed in image format F made up of 1125 lines×2280 pixels into a video signal F' made in an image format made up of 1125/1687/1688 lines×2240 pixels having an active area of 1080 lines×1920 pixels in order to change its blanking area.

Image format A of 787/788 lines×1600 pixels having an active area of 720 lines×1280 pixels and image format E of 1125 lines×2240 pixels having an active area of 1080 lines×1920 pixels are output as A' and E', without their blanking areas being changed in blanking area converting portion 20. Here, also in the image signals made in image formats B'–F', the remainders excluding the active areas become their blanking areas.

Of the video data output from decoder 10, video data made in image formats A, B and C is stored in FIFO memory 21 under the control of controller 24, and converted into the abovementioned image formats A', B' and C'.

Of the video data output from decoder 10, video data in image format D and field structure is divided into top and bottom fields under the control of controller 24, and stored in FIFO memories 21 and 22, respectively. Then, the data is read out alternately from FIFO memories 21 and 22 in units of line. By doing so, the video data in field structure is converted into frame structured data.

Of the video data output from decoder 10, video data in image format D and frame structure is alternately stored in FIFO memories 21 and 22 in units of line under the control of controller 24, and read out alternately from FIFO memories 21 and 22 in units of line. The video data read out from FIFO memories 21 and 22 is selected by multiplexer 23 and then output to IPC portion 30.

In order to convert the blanking area, controller 24 receives the image format information and picture structure information output from decoder 10, and controls the write and read of FIFO memories 21 and 22 and the selection of multiplexer 23, using process line sync signal PLS and process vertical sync signal PVS output from sync signal generator 100.

The video signal output from multiplexer 23 of blanking converting portion 20 is converted into a video signal of sequential scanning mode in IPC portion 30 according to process line sync signal PLS output from sync signal generator 100 and the image format information and display format output from and decoder 10.

In other words, in case that the input video data is made in image format D of interlaced scanning mode and that its display format is sequential scanning mode, the image format of the video data is converted into sequential scanning mode, using a three-point median filter using the pixel value of the upper and lower lines of the top field, that is, the current field, and the pixel value of the same position of the bottom field, that is, the succeeding field. In other cases, the data is bypassed.

The video data output from IPC portion 30 is vertically sampled down by 3:2 in VDS portion 40 in order to be converted into a corresponding image format, according to process line sync signal PLS output from sync signal generator 100 and the image format information output from decoder 10.

In case that the video signal input from IPC portion 30 is in image format D, E or F, it is vertically sampled down by 3:2 in VDS portion 40. In other cases, the signal is bypassed.

The video signal output from IPC portion 30 is converted into a video signal of interlaced scanning mode in PIC portion 50 according to process line sync signal PLS output from sync signal generator 100 and the image format information output from decoder 10.

In case that the input video signal is in image format A, B or C, it is vertically sampled down by 4:3 in PIC portion 50, coinciding with the top and bottom fields. By doing so, the signal is converted in the interlaced scanning mode. In other cases, the signal is bypassed.

The video data output from VDS portion 40 and PIC portion 50 is selected and output from multiplexer 60 according to input display format signal prog. If the externally input display format signal prog is 1, which indicates the sequential scanning mode, multiplexer 60 selects and outputs the video data output from VDS portion 40. If the externally input display format signal prog is 0, which indicates the interlaced scanning mode, multiplexer 60 selects and outputs the video data output from PIC portion 50.

The video data output from multiplexer 60 is horizontally sampled down by 3:2 in HDS portion 70 in order to be converted into a corresponding image format, according to the image format information and display format output from decoder 10.

In case that the input video signal is in image format D, E or F and its display format is the sequential scanning mode, it is horizontally sampled down by 3:2 in HDS portion 70. In other cases, the signal is bypassed.

The frame rate of the video data output from HDS portion 70 is changed to 60 Hz in frame rate converting portion 80 according to process line sync signal PLS, process vertical sync signal PVS, display line sync signal DLS, and display vertical sync signal DVS output from sync signal generator 100, the control signals output from HDS portion 70, and the image format information and display format output from decoder 10.

In frame rate converting portion 80, if data is displayed in the sequential scanning mode, only FIFO memory 81 reads out it. If data is displayed in the interlaced scanning mode, the top field data is read out by FIFO memory 81, the bottom field data by FIFO memory 82, alternately. Through this procedure, its frame rate is changed.

In order to convert the frame rate, controller 84 controls the read and write of FIFO memories 81 and 82 and the selection of multiplexer 83 according to the image format information and display format output from decoder 10, using process line sync signal PLS, process vertical sync signal PVS, display line sync signal DLS, and display vertical sync signal DVS output from sync signal generator 100, and the control signals output from VDS portion 40, PIC portion 50 and HDS portion 70.

The video data output from frame rate converting portion 80 is horizontally sampled up by 2:3 in HUS portion 90 according to the display format, and then output to a monitor.

In case that the input video signal is in image format A, B or C and its display format is the interlaced scanning mode, it is horizontally sampled up by 2:3 in HUS portion 90. In other cases, the signal is bypassed.

Figure 4:
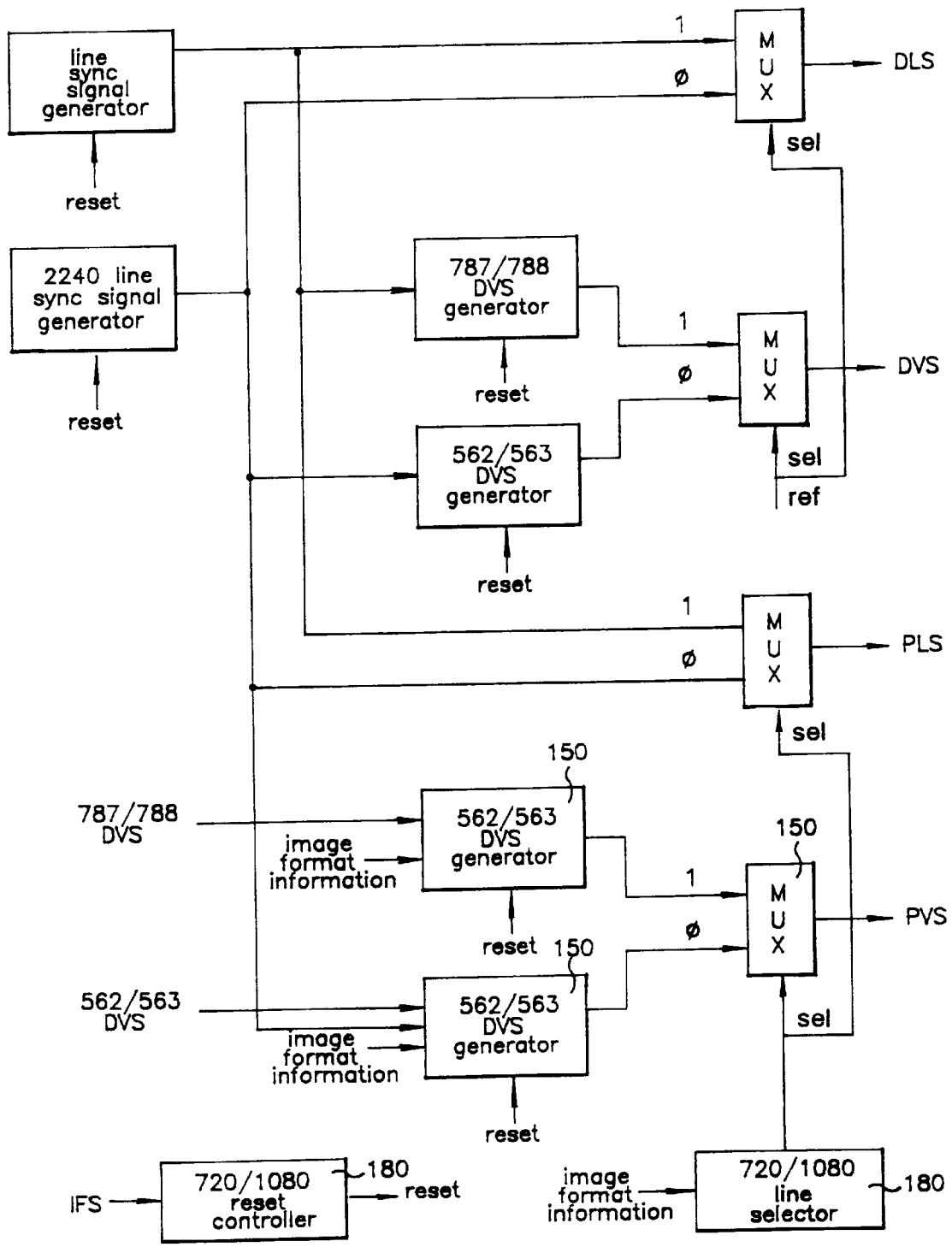
FIG. 4 is a detailed block diagram of the sync signal generator of FIG. 1.

Referring to FIG. 4, sync signal generator 100 comprises a 1600 line sync signal generator 110 for generating a 1600 line sync signal using an externally input reference clock, a 2240 line sync signal generator 120 for generating a 2240 line sync signal using the externally input reference clock, a multiplexer 101 for selecting one of the line sync signals output from 1600 line sync signal generator 110 and 2240 line sync signal generator 120 according to the display format, and outputting a display line sync signal DLS, a 787/788 display vertical sync signal generator 130 for generating a 787/788 display vertical sync signal 787/788 DVS using the signal output from 1600 line sync signal generator 110, a 562/563 display vertical sync signal generator 140 for generating a 562/563 display vertical sync signal 562/563 DVS using the signal output from 2240 line sync signal generator 120, a multiplexer 102 for selecting one of the display vertical sync signals output from 787/788 display vertical sync signal generator 130 and 562/563 display vertical sync signal generator 140 according to the display format, and outputting a display vertical sync signal DVS, a 720/1080 line selector 180 for deciding whether the current signal is a 720 line signal or 1080 line signal according to the image format output from decoder 10, a multiplexer 103 for selecting one of the 1600 and 2240 line sync signals output from 1600 line sync signal generator 110 and 2240 line sync signal generator 120, and outputting a process line sync signal PLS, a 720 process vertical sync signal generator 150 for generating a 720 process vertical sync signal 720 DVS using the 787/788 display vertical sync signal 787/788 DVS output from 787/788 display vertical sync signal generator 130 according to the image format information output from decoder 10, a 1080 process vertical sync signal generator 160 for generating a 1080 process vertical sync signal 1080 DVS using the 562/563 display vertical sync signal 562/563 DVS output from 562/563 display vertical sync signal generator 140 according to the image format information output from decoder 10, a multiplexer 104 for selecting one of the 720 and 1080 process vertical sync signals 720 and 1080 PVSs output from 720 process vertical sync signal generator 150 and 1080 process vertical sync signal generator 160, and outputting a process vertical sync signal PVS, and a reset controller 170 for detecting the rising edge of the input frequency sync signal IFS output from decoder 10, and resetting 1600 line sync signal generator 110, 2240 line sync signal generator 120, 787/788 display vertical sync signal generator 130, 562/563 display vertical sync signal generator 140, 720 process vertical sync signal generator 150, and 1080 process vertical sync signal generator 160. The operation of the sync signal generator 100 will be described below.

The respective input sync signals are, first, explained with reference to FIGS. 5A, 5B and 5C.

Figure 5A:
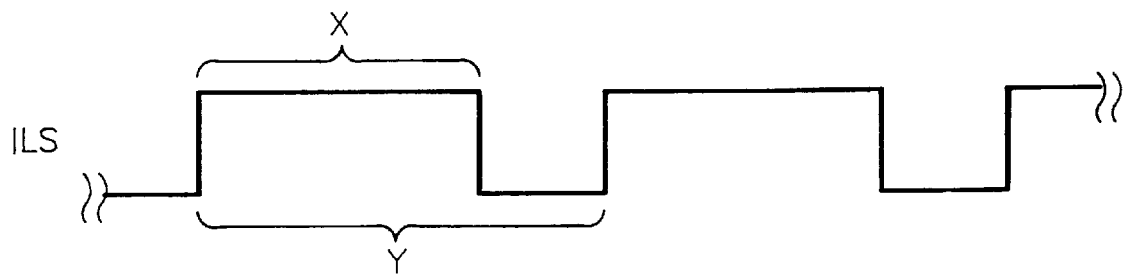
FIGS. 5A, 5B and 5C are waveform diagrams of the input signals of FIG. 4.

According to the image formats A–F of the input video signal, as shown in FIG. 5A, input line sync signal ILS stays HIGH to indicate an active area, for a predetermined time X, from reference clocks produced as many as the pixel number for one line period Y.

In case the input video signal is in image format A, input line sync signal ILS indicates one line during the period Y during which the 1600 reference clocks are produced corresponding to 1600 pixels, and stays HIGH to indicate an active area during the period X during which 1280 reference clocks are produced corresponding to 1280 pixels.

In case the input video signal is in image format B, input line sync signal ILS indicates one line during the period Y during which the 3200 reference clocks are produced corresponding to 3200 pixels, and stays HIGH to indicate an active area during the period X during which 1280 reference clocks are produced corresponding to 1280 pixels.

In case the input video signal is in image format C, input line sync signal ILS indicates one line during the period Y during which the 4000 reference clocks are produced corresponding to 4000 pixels, and stays HIGH to indicate an active area during the period X during which 1280 reference clocks are produced corresponding to 1280 pixels.

In case the input video signal is in image format D, input line sync signal ILS indicates one line during the period Y during which the 2240 reference clocks are produced corresponding to 2240 pixels, and stays HIGH to indicate an active area during the period X during which 1920 reference clocks are produced corresponding to 1920 pixels.

In case the input video signal is in image format E, input line sync signal ILS indicates one line during the period Y during which the 2240 reference clocks are produced corresponding to 2240 pixels, and stays HIGH to indicate an active area during the period X during which 1920 reference clocks are produced corresponding to 1920 pixels.

In case the input video signal is in image format F, input line sync signal ILS indicates one line during the period Y during which the 2280 reference clocks are produced corresponding to 2280 pixels, and stays HIGH to indicate an active area during the period X during which 1920 reference clocks are produced corresponding to 1920 pixels.

Figure 5B:
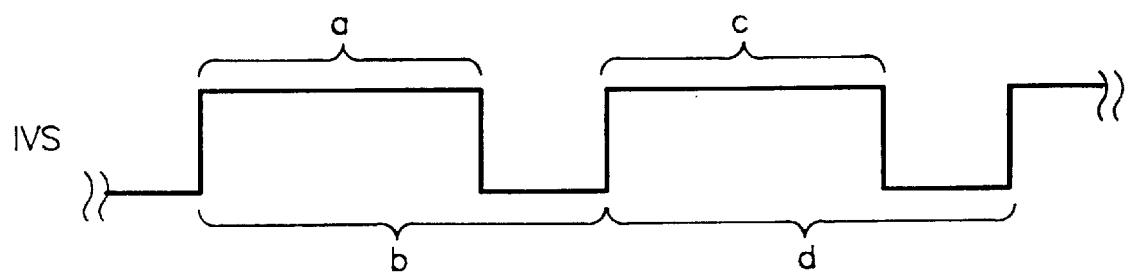

According to the image formats A–F of the input video signal, as shown in FIG. 5B, input vertical sync signal IVS stays HIGH to indicate an active area, for a predetermined time a or c, from the line sync signals produced as many as the line number for one frame or field period b or d. Here, the line sync signals become 1600 or 2240 line sync signals according to the image format of the input video signal.

Specifically, in case that the input video signal is in image format A, B or C, input vertical sync signal IVS indicates one frame during a period b during which 787 1600 line sync signals are produced corresponding to 787 lines, and stays HIGH to indicate an active area during a period a during which 720 1600 line sync signals are produced corresponding to 720 lines. In the next frame, input vertical sync signal IVS indicates one frame during a period d during which 788 1600 line sync signals are produced corresponding to 788 lines, and stays HIGH to indicate an active area during a period c during which 720 1600 line sync signals are produced corresponding to 720 lines.

In case that the input video signal is in image format D and in the frame structure, input vertical sync signal IVS indicates one field during a period b during which 562 2240 line sync signals are produced corresponding to 562 lines, and stays HIGH to indicate an active area during a period a during which 540 2240 line sync signals are produced corresponding to 540 lines. In the next field, input vertical sync signal IVS indicates one field during a period d during which 563 2240 line sync signals are produced corresponding to 563 lines, and stays HIGH to indicate an active area during a period c during which 540 2240 line sync signals are produced corresponding to 540 lines.

In case that the input video signal is in image format D and in the sequential scanning mode, input vertical sync signal IVS indicates one frame during a period b during which 1125 2240 line sync signals are produced corresponding to 1125 lines, and stays HIGH to indicate an active area during a period a during which 1080 2240 line sync signals are produced corresponding to 1080 lines. In the next frame, like the previous frame, input vertical sync signal IVS indicates one field during a period d during which 1125 2240 line sync signals are produced corresponding to 1125 lines, and stays HIGH to indicate an active area during a period c during which 1080 2240 line sync signals are produced corresponding to 1080 lines.

In case that the input video signal is in image format E or F, input vertical sync signal IVS indicates one frame during a period b during which 1125 2240 line sync signals are produced corresponding to 1125 lines, and stays HIGH to indicate an active area during a period a during which 1080 2240 line sync signals are produced corresponding to 1080 lines. In the next frame, like the previous frame, input vertical sync signal IVS indicates one frame during a period d during which 1125 2240 line sync signals are produced corresponding to 1125 lines, and stays HIGH to indicate an active area during a period c during which 1080 2240 line sync signals are produced corresponding to 1080 lines.

Figure 5C:
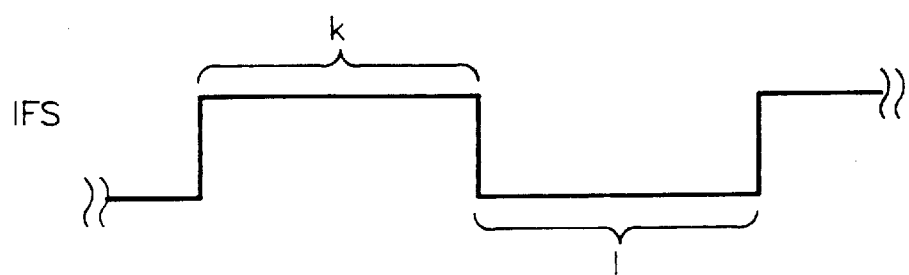

According to image formats A–F of the input video signal, as shown in FIG. 5C, input frequency sync signal IFS is HIGH while two input vertical sync signals IVS are produced, and then becomes LOW while two input vertical sync signals IVS are produced.

Reset controller 170 detects the rising edge of the input frequency sync signal IFS to generate a reset signal, which resets 1600 line sync signal generator 110, 2240 line sync signal generator 120, 787/788 display vertical sync signal generator 130, 562/563 display vertical sync signal generator 140, 720 process vertical sync signal generator 150, and 1080 process vertical sync signal generator 160. 1600 line sync signal generator 110 and 2240 line sync signal generator 120 make the 1600 and 2240 line sync signals according to the externally input reference clock.

The 1600 line sync signal produced from 1600 sync signal generator 110 stays HIGH to indicate an active area while 1280 reference clocks are produced. The 2240 line sync signal produced from 2240 sync signal generator 120 stays HIGH to indicate an active area while 1920 reference clocks are produced.

The line sync signals output from 1600 line sync signal generator 110 and 2240 line sync signal generator 120 are input to multiplexer 101 and selected according to display format signal prog indicative of the display format. The selected signal is output as display line sync signal DLS.

The 1600 line sync signal output from 1600 line sync signal generator 110 is input to 787/788 display vertical sync signal generator 130 and used to generate 787/788 display vertical sync signal 787/788 DVS.

The 2240 line sync signal output from 2240 line sync signal generator 120 is input to 562/563 display vertical sync signal generator 140 and used to generate 562/563 display vertical sync signal 562/563 DVS.

The 787/788 display vertical sync signal and 562/563 display vertical sync signal output from 787/788 display vertical sync signal generator 130 and 562/563 display vertical sync signal generator 140 are input to multiplexer 102 and selected according to display format signal prog indicative of the display format. The selected signal is output as display vertical sync signal DVS.

The image format information output from decoder 10 is input to 720/1080 line selector 180 to decide whether the input video signal is a signal of 720 lines or 1080 lines. In case that the input video signal is in image format A, B or C according to the image format information, 702/1080 line selector 180 outputs 1 to select 720 lines. In case that the input video signal is in image format D, E or F, the selector outputs 0 to select 1080 lines.

The 1600 and 2240 line sync signals output from 1600 line sync signal generator 110 and 2240 line sync signal generator 120 are input to multiplexer 103 and selected under the control of 720/1080 line selector 180. The selected signal is output as process line sync signal PLS.

When 720/1080 line selector 180 selects 720 lines and outputs 1, multiplexer 103 selects 1600 line sync signals and outputs process line sync signal PLS. When 720/1080 line selector 180 selects 1080 lines and outputs 0, multiplexer 103 selects 2240 line sync signals and outputs process line sync signal PLS.

787/788 display vertical sync signal 787/788 DVS output from 787/788 display vertical sync signal generator 130 is input to 720 process vertical sync signal generator 150 and used to generate 720 process vertical sync signal 720 PVS according to the image format output from decoder 10.

562/563 display vertical sync signal 562/563 DVS output from 562/563 display vertical sync signal generator 140 is input to 1080 process vertical sync signal generator 160 and used to generate 1080 process vertical sync signal 1080 PVS according to the image format output from decoder 10.

The 720 and 1080 process vertical sync signals 720 and 1080 PVSs output from 720 process vertical sync signal generator 150 and 1080 process vertical sync signal generator 160 are input to multiplexer 104 and selected under the control of 720/1080 line selector 180. The selected signal is output as process vertical sync signal PVS.

When 720/1080 line selector 180 selects 720 lines and outputs 1, multiplexer 104 selects 720 process vertical sync signal 720 PVS and outputs process vertical sync signal PVS. When 720/1080 line selector 180 selects 1080 lines and outputs 0, multiplexer 104 selects 1080 process vertical sync signal 1080 and outputs process vertical sync signal PVS.

Figure 6:
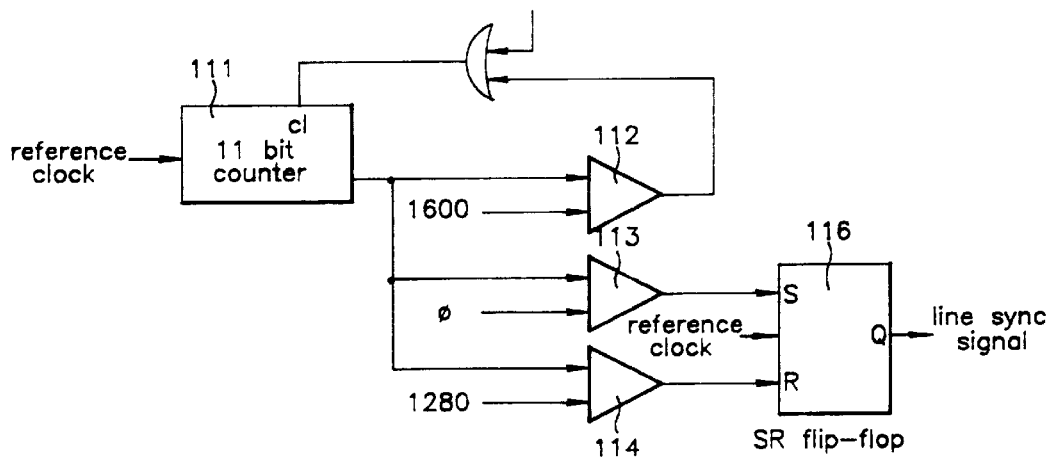
FIG. 6 is a detailed circuit diagram of the 1600-line sync signal generator of FIG. 4.
Figure 7:
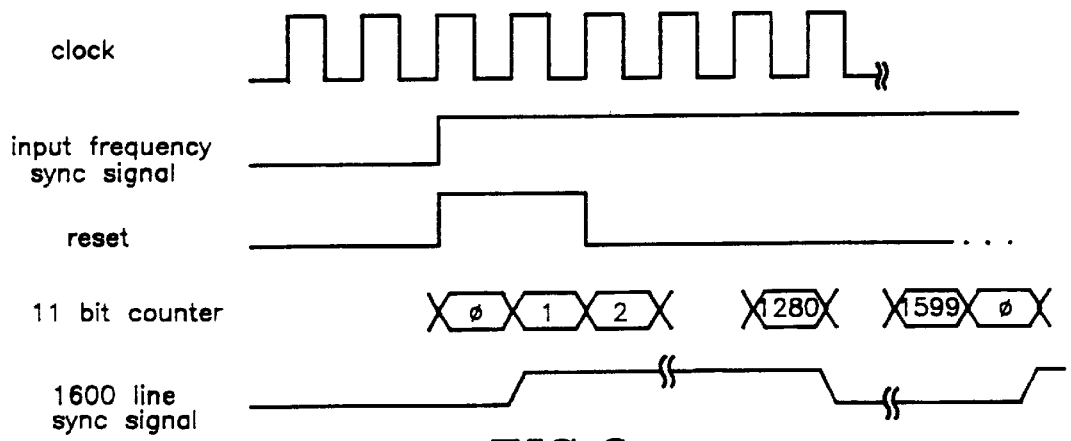
FIG. 7 shows signal waveforms present at the respective portions of FIG. 6.

Referring to FIG. 6, 1600 line sync signal generator 110 comprises a 11-bit counter 111 for counting an externally input reference clock, a comparator 112 for comparing the signal output from 11-bit counter 111 with 1600, an OR gate 115 for logically summing the signal output from comparator 112 and the reset signal output from reset controller 170, and inputting the result to 11-bit counter 111 as the clear input, a comparator 113 for comparing the signal output from 11-bit counter 111 with 0, a comparator 114 for comparing the signal output from 11-bit counter 111 with 1280, and an SR flipflop 116 for receiving the signal output from comparator 113 as the set input, the signal output from comparator 114 as the reset input, and the externally input reference clock as the clear input, and outputting the 1600 line sync signal. The operation of 1600 line sync signal generator 110 will be described below with reference to FIG. 7.

When the reset signal of reset controller 170 is 1, 11-bit counter 111 becomes 0, and counts in accordance with the externally input reference clock. At the moment that the value output from 11-bit counter 111 becomes 1600 by comparator 112, 11-bit counter 111 is cleared again so that 11-bit counter 111 counts 1600 reference clocks, in total, from 0 to 1599.

When the value output from 11-bit counter 111 becomes 0, the set port S of SR flipflop 116 becomes 1 according to the output of comparator 113, and therefore its output Q becomes 1. When the value output from 11-bit counter 111 becomes 1280, the reset port R of SR flipflop 116 becomes 1 according to the output of comparator 114, and therefore its output Q becomes 0. In the 1600 line sync signal, its active area of 1280 pixels stays HIGH.

Figure 8:
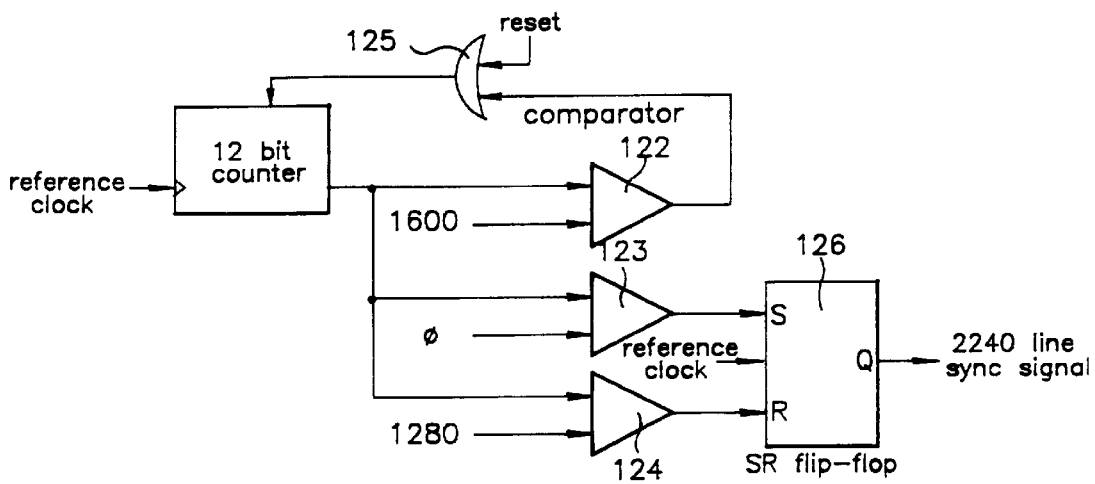
FIG. 8 is a detailed circuit diagram of the 2240-line sync signal generator of FIG. 4.

Referring to FIG. 8, 2240 line sync signal generator 120 comprises a 12-bit counter 121 for counting an externally input reference clock, a comparator 122 for comparing the signal output from 12-bit counter 121 with 2240, an OR gate 125 for logically summing the signal output from comparator 122 and the reset signal output from reset controller 170, and inputting the result to 12-bit counter 121 as the clear input, a comparator 123 for comparing the signal output from 12-bit counter 121 with 0, a comparator 124 for comparing the signal output from 12-bit counter 121 with 1920, and an SR flipflop 126 for receiving the signal output from comparator 123 as the set input, the signal output from comparator 124 as the reset input, and the externally input reference clock as the clear input, and outputting the 2400 line sync signal. The operation of 2240 line sync signal generator 120 will be described below.

When the reset signal of reset controller 170 is 1, 12-bit counter 121 becomes 0, and counts in accordance with the externally input reference clock. At the moment that the value output from 12-bit counter 121 becomes 2240 by comparator 122, 12-bit counter 121 is cleared again so that 12-bit counter 121 counts 2240 reference clocks, in total, from 0 to 2239.

When the value output from 12-bit counter 121 becomes 0, the set port S of SR flipflop 126 becomes 1 according to the output of comparator 123, and therefore its output Q becomes 1. When the value output from 12-bit counter 121 becomes 1920, the reset port R of SR flipflop 126 becomes 1 according to the output of comparator 124, and therefore its output Q becomes 0. In the 2240 line sync signal, its active area of 1920 pixels stays HIGH.

Figure 9:
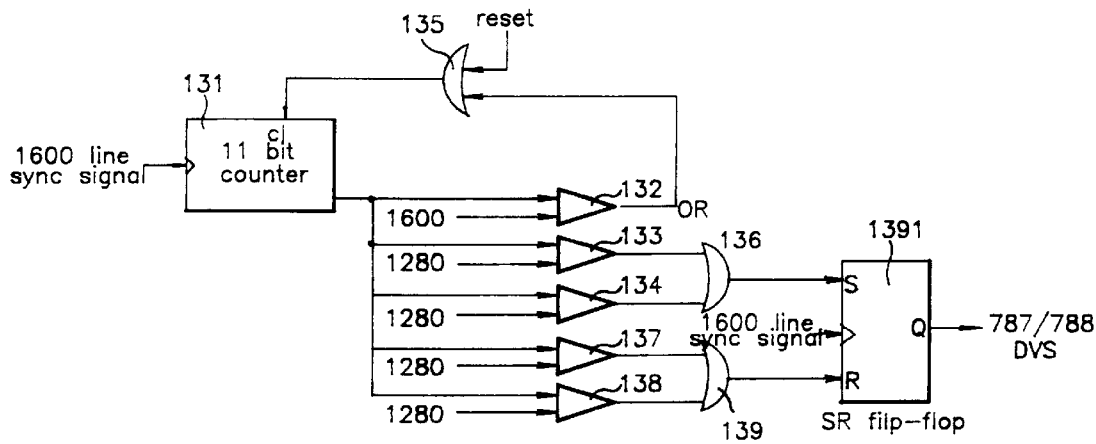
FIG. 9 is a detailed circuit diagram of the 787/788 display vertical sync signal (DVS) generator of FIG. 4.
Figure 10:
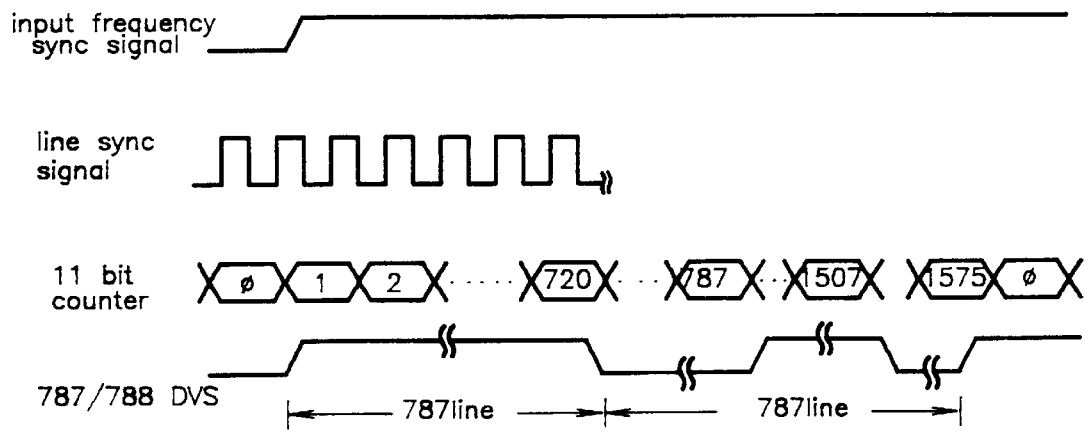
FIG. 10 shows signal waveforms present at the respective portions of FIG. 9.

Referring to FIG. 9, 787/788 display vertical sync signal generator 130 comprises a 11-bit counter 131 for counting the 1600 line sync signal output from 1600 line sync signal generator 110, a comparator 132 for comparing the signal output from 11-bit counter 131 with 1575, an OR gate 135 for logically summing the signal output from comparator 132 and the reset signal output from reset controller 170, and inputting the result to 11-bit counter 131 as the clear input, a comparator 133 for comparing the signal output from 11-bit counter 131 with 0, a comparator 134 for comparing the signal output from 11-bit counter 131 with 787, a comparator 137 for comparing the signal output from 11-bit counter 131 with 720, a comparator 138 for comparing the signal output from 11-bit counter 131 with 1507, an OR gate 136 for logically summing the signals output from comparators 134 and 134, an OR gate 139 for logically summing the signals output from comparators 137 and 138, and an SR flipflop 1391 for receiving the signal output from OR gate 136 as the set input, the signal output from OR gate 139 as the reset input, and the 1600 line sync signal output from 1600 line sync signal generator 110 as the clock input, and outputting the 787/788 display vertical sync signal. The operation of 787/788 display vertical sync signal generator 130 will be described below with reference to FIG. 10.

11-bit counter 131 counts in units of line because the 1600 line sync signal output from 1600 line sync signal generator 110 is used as a clock.

When the reset signal of reset controller 170 is 1, 11-bit counter 131 becomes 0 for its initialization, and counts in accordance with the 1600 line sync signal. At the moment that the value output from 11-bit counter 131 becomes 1575 by comparator 132, 11-bit counter 131 is cleared again so that 11-bit counter 131 counts 1575 lines, in total, from 0 to 1574.

When the value output from 11-bit counter 131 becomes 0, the set port S of SR flipflop 1391 becomes 1 through OR gate 136 according to the output of comparator 133, and therefore its output Q becomes 1. When the value output from 11-bit counter 131 becomes 720, the reset port R of SR flipflop 1391 becomes 1 through OR gate 139 according to the output of comparator 137, and therefore its output Q becomes 0.

When the value output from 11-bit counter 131 becomes 787, the set port S of SR flipflop 1391 becomes 1 through OR gate 136 according to the output of comparator 134, and therefore its output Q becomes 1. When the value output from 11-bit counter 131 becomes 1507, the reset port R of SR flipflop 1391 becomes 1 through OR gate 139 according to the output of comparator 138, and therefore its output Q becomes 0. In the 787/788 display vertical sync signal, of the current frame of 787 lines, the active area of 720 lines stays HIGH. Of the succeeding frame of 788 lines, the active area of 720 lines stays HIGH. In other words, 787/788 display vertical sync signal generator 130 alternately outputs 787 and 788 line display vertical sync signals which stay HIGH to indicate an active area while 720 1600 line sync signals are produced.

Figure 11:
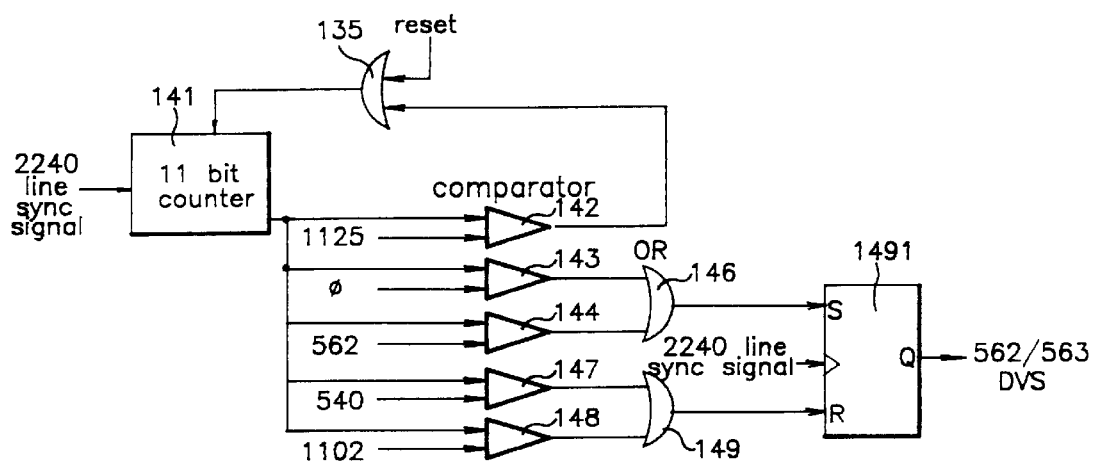
FIG. 11 is a detailed circuit diagram of the 562/563 display vertical sync signal generator of FIG. 4.
Figure 14A:
FIGS. 14A–14F show signal waveforms present at the respective portions of FIG. 12.
Figure 14B:
Figure 14C:
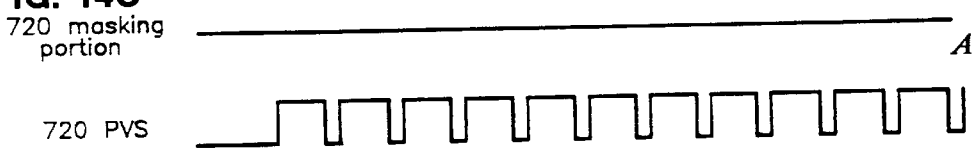
Figure 14D:
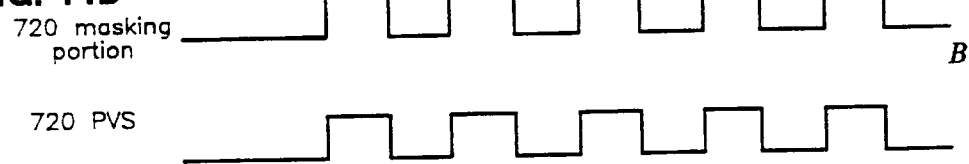
Figure 14E:
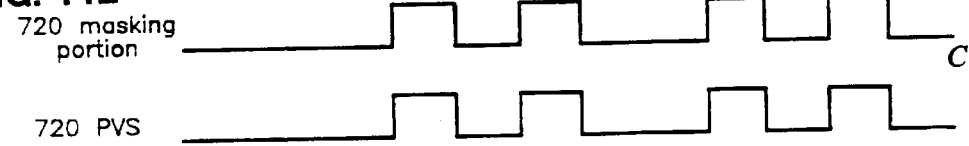
Figure 14F:
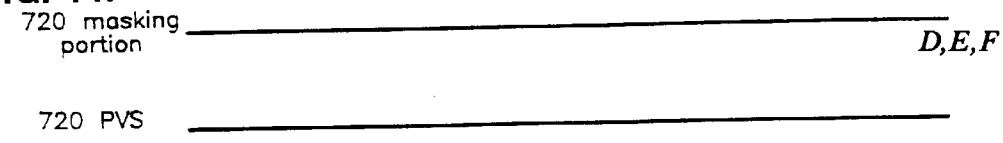

Referring to FIG. 11, 562/563 display vertical sync signal generator 140 comprises a 11-bit counter 131 for counting the 2240 line sync signal output from 2240 line sync signal generator 120, a comparator 142 for comparing the signal output from 11-bit counter 141 with 1125, an OR gate 145 for logically summing the signal output from comparator 142 and the reset signal output from 720/1080 reset controller 170, and inputting the result to 11-bit counter 141 as the clear input, a comparator 143 for comparing the signal output from 11-bit counter 141 with 0, a comparator 144 for comparing the signal output from 11-bit counter 141 with 562, a comparator 147 for comparing the signal output from 11-bit counter 141 with 540, a comparator 148 for comparing the signal output from 11-bit counter 141 with 1102, an OR gate 146 for logically summing the signals output from comparators 143 and 144, an OR gate 149 for logically summing the signals output from comparators 147 and 148, and an SR flipflop 1491 for receiving the signal output from OR gate 146 as the set input, the signal output from OR gate 149 as the reset input, and the 2240 line sync signal output from 2240 line sync signal generator 120 as the clock input, and outputting the 562/563 display vertical sync signal. The operation of 562/563 display vertical sync signal generator 140 will be described below.

11-bit counter 141 counts in units of line because the 2240 line sync signal output from 2240 line sync signal generator 120 is used as a clock.

When the reset signal of 720/1080 reset controller 170 is 1, 11-bit counter 141 becomes 0 for its initialization, and counts in accordance with the 2240 line sync signal. At the moment that the value output from 11-bit counter 141 becomes 1125 by comparator 142, 11-bit counter 141 is cleared again so that 11-bit counter 141 counts 1125 lines, in total, from 0 to 1124.

When the value output from 11-bit counter 141 becomes 0, the set port S of SR flipflop 1491 becomes 1 through OR gate 146 according to the output of comparator 143, and therefore its output Q becomes 1. When the value output from 11-bit counter 141 becomes 540, the reset port R of SR flipflop 1491 becomes 1 through OR gate 149 according to the output of comparator 147, and therefore its output Q becomes 0.

When the value output from 11-bit counter 141 becomes 562, the set port S of SR flipflop 1491 becomes 1 through OR gate 146 according to the output of comparator 144, and therefore its output Q becomes 1. When the value output from 11-bit counter 141 becomes 1102, the reset port R of SR flipflop 1491 becomes 1 through OR gate 149 according to the output of comparator 148, and therefore its output Q becomes 0. In the 562/563 display vertical sync signal, of the current frame of 562 lines, the active area of 540 lines stays HIGH. Of the succeeding frame of 563 lines, the active area of 540 lines stays HIGH. In other words, 562/563 display vertical sync signal generator 140 alternately outputs 562 and 563 line display vertical sync signals which stay HIGH to indicate an active area while 540 2240 line sync signals are produced.

Referring to FIG. 12, 720 process vertical sync signal (PVS) generator 150 comprises a 4-bit counter 151 for counting 787/788 display vertical sync signal 787/788 DVS output from 787/788 display vertical sync signal generator 130, a 720 masking portion 152 for taking the image format information output from decoder 10 and the output signal of 4-bit counter 151 as the 720 input, to thereby output a signal for masking 787/788 display vertical sync signal 787/788 DVS, and an AND gate 153 for logically multiplying the 787/788 display vertical sync signal 787/788 DVS output from 787/788 display vertical sync signal generator 130 and the signal output from 720 masking portion 152. The operation of 720 process vertical sync signal generator 150 will be explained below with reference to FIG. 14.

4-bit counter 151 uses the 787/788 display vertical sync signal as a clock, and is initialized as 0 when the reset signal output from 720/1080 reset controller 170 becomes 1. Then, the counter counts only until 9 and returns to 0. In other words, 4-bit counter 151 counts 10 in total, from 0 to 9.

720 masking portion 152 controls AND gate 153 to form the 720 process vertical sync signal from the 787/788 display vertical sync signal, using the output of 4-bit counter 151 and the image format information.

As shown in FIG. 13, 720 masking portion 152 outputs 1 in case that according to the image format information input, the input video signal is in image format A of 787/788 lines×1600 pixels containing an active area of 720 lines× 1280 pixels, in case that the input video signal is in image format B of 787/788 lines×3200 pixels containing an active area of 720 lines×1280 pixels and that the signal output from 4-bit counter 151 is odd, and in case that the input video signal is in image format C of 787/788 lines×4000 pixels containing an active area of 720 lines×1280 pixels and that the signal output from 4-bit counter 151 is 2, 4, 7 or 9.

720 masking portion 152 outputs 0 in case that the input video signal is in image format B of 787/788 lines×3200 pixels containing an active area of 720 lines×1280 pixels and that the signal output from counter 151 is even, in case that the input video signal is in image format C of 787/788 lines×4000 pixels containing an active area of 720 lines× 1280 pixels and that the signal output from 4-bit counter 151 is 0, 1, 3, 5, 6, or 8, in case that the input video signal is in image format D of 562/563 lines×2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines× 1920 pixels.

When 720 masking portion 152 outputs 0, 720 process vertical sync signal of 0 is output by AND gate 153 regardless of the 787/788 display vertical sync signal. When 720 masking portion 152 outputs 1, the 787/788 display vertical sync signal is output as the 720 process vertical sync signal by AND gate 153 without change. The 720 process vertical sync signal output via AND gate 153 according to the image formats A–F of the input video signal will be shown in FIG. 14.

Figure 15:
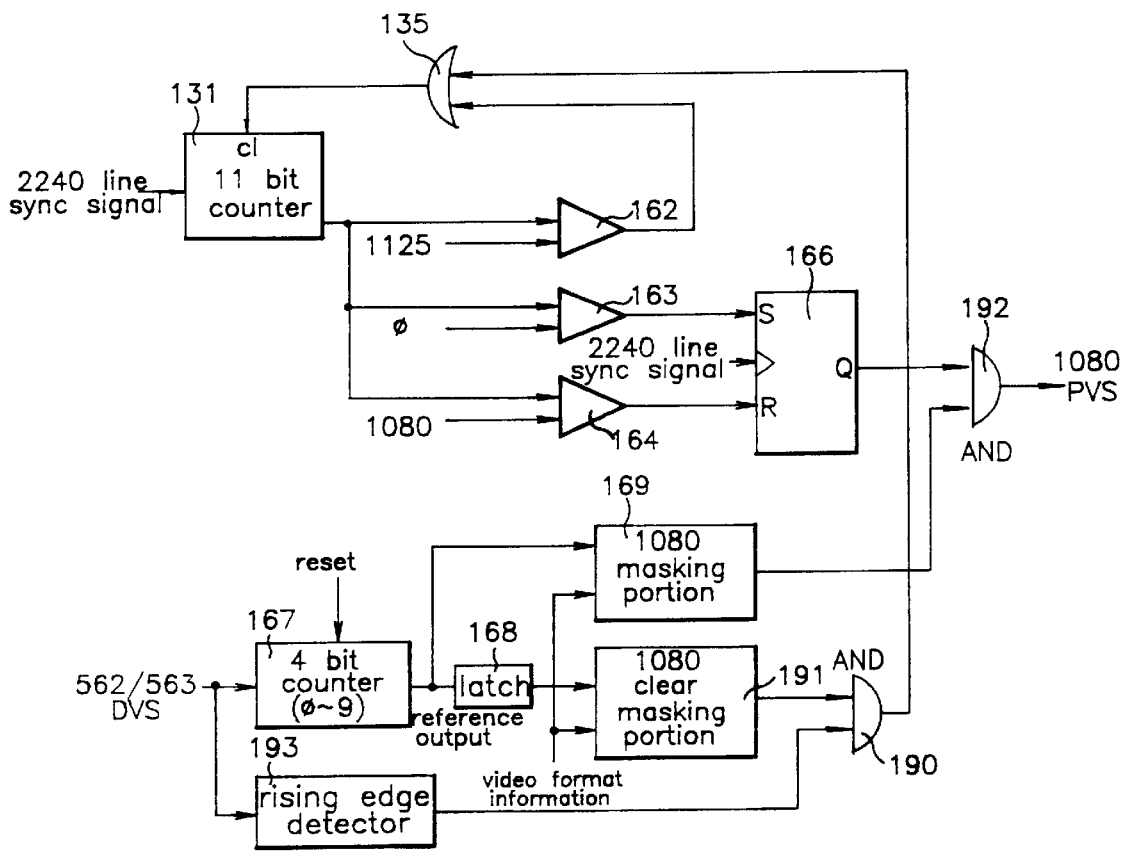
FIG. 15 is a detailed circuit diagram of the 1080 process vertical sync signal generator of FIG. 4.
Figure 16A:
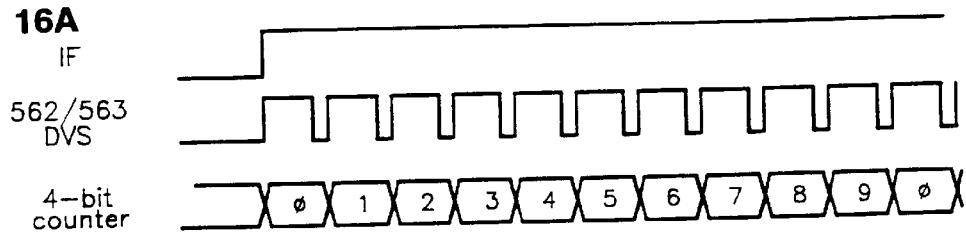
FIGS. 16A–16F are waveform diagrams of the respective portions of FIG. 15.
Figure 16B:
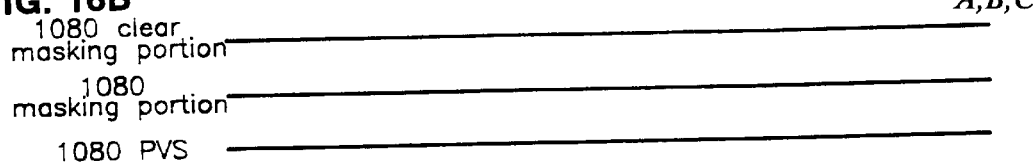
Figure 16C:
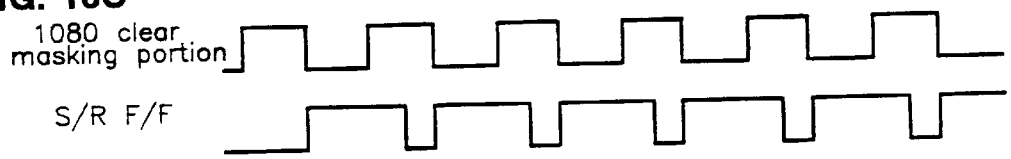
Figure 16D:
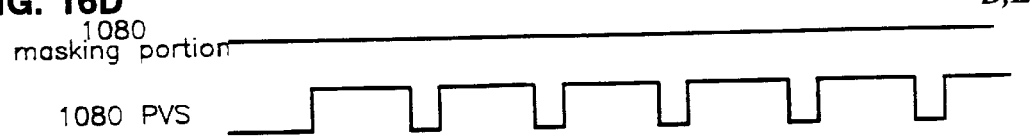
Figure 16E:
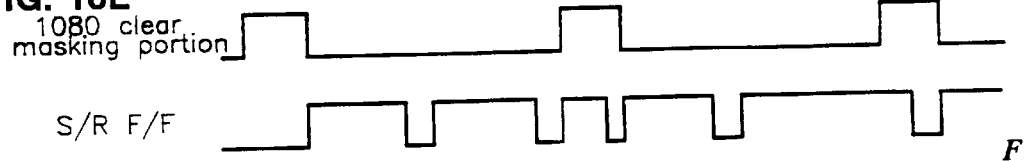
Figure 16F:
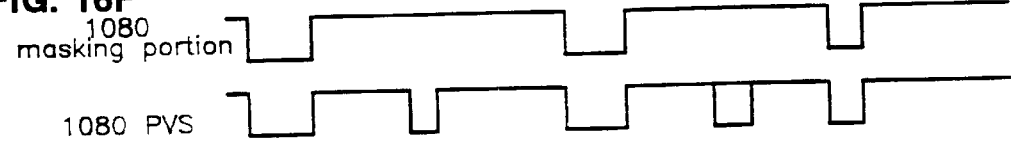

Referring to FIG. 15, 1080 process vertical sync signal generator 160 comprises a 4-bit counter 167 for receiving the reset signal output from 720/1080 reset controller 170 as the clear input, and counting 562/563 display vertical sync signal 562/563 DVS output from 562/563 display vertical sync signal generator 140, a latch 168 for latching the signal output from 4-bit counter 167 according to the externally input reference clock, a 1080 masking portion 169 for receiving the image format information output from decoder 10 and the output signal of 4-bit counter 167, to thereby output a 1080 masking signal, a 1080 clear masking portion 191 for receiving the image format information output from decoder 10 and the output signal of latch 168 to thereby output a 1080 clear masking signal, a rising edge detector 193 for detecting the rising edge of 562/563 display vertical sync signal 562/563 DVS output from 562/563 display vertical sync signal generator 140, an AND gate 190 for logically multiplying the signals output from 1080 clear masking portion 191 and rising edge detector 193, a 11-bit counter 161 for counting the 2240 line sync signal output from 2240 line sync signal generator 120, a comparator 162 for comparing the signal output from 11-bit counter 161 with 1125, an OR gate 165 for logically summing the signal output from comparator 162 and the signal output from AND gate 190, and inputting the result to 11-bit counter 161 as the clear input, a comparator 163 for comparing the signal output from 11-bit counter 161 with 0, a comparator 164 for comparing the signal output from 11-bit counter 161 with 1080, an SR flipflop 166 for receiving the signal output from comparator 163 as the set input, the signal output from comparator 164 as the reset input, and the 2240 line sync signal output from 2240 line sync signal generator 120 as the clock input, and an AND gate 192 for logically multiplying the signals output from 1080 masking portion 169 and SR flipflop 166.

First, 4-bit counter 167 uses counts 10 in total, from 0 to 9, by taking the 562/563 display vertical sync signal output from 562/563 display vertical sync signal generator 140 as the clock. 11-bit counter 161 counts 1125 in total from 0 to 1124, by taking the 2240 line sync signal output from 2240 line sync signal generator 120 as the clock, and is cleared by a signal in which the output signal of rising edge detector 193 for detecting the rising edge of 562/563 display vertical sync signal is masked by the output of 1080 clear masking portion 191.

As shown in FIG. 17, 1080 masking portion 169 outputs 0 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, in case that the input video signal is in image format C of 787/788 lines×4000 pixels containing an active area of 720 lines×1280 pixels, and in case that the input video signal is in image format F of 1125 lines×2280 pixels containing an active area of 1080 lines×1920 pixels and that the signal output from 4-bit counter 167 is 0 or 5.

1080 masking portion 169 outputs 1 in case that the input video signal is in image format D of 562/563 lines×2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels and that the signal output from 4-bit counter 167 is 1, 2, 3, 4, 6, 7, 8, or 9.

Referring to FIG. 18, 1080 clear masking portion 191 outputs 0 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, in case that the input video signal is in image format C of 787/788 lines×4000 pixels containing an active area of 720 lines×1280 pixels, in case that the input video signal is in image format D of 562/563 lines×2240 pixels containing an active area of 540 lines×1920 pixels and that the signal output from latch 168 is odd, in case that the input video signal is in image format E of 1125 lines×2240 pixels containing an active area of 1080 lines×1920 pixels and that the signal output from latch 168 is odd, and in case that the input video signal is in image format F of 1125 lines×2280 pixels containing an active area of 1080 lines×1920 pixels and that the signal output from latch 168 is 1, 2, 3, 4, 6, 7, 8, or 9.

1080 clear masking portion 191 outputs 1 in case that the input video signal is in image format D of 562/563 lines×2240 pixels containing an active area of 540 lines×1920 pixels and that the signal is output from latch 168 is even, in case that the input video signal is in image format E of 1125 lines×2240 pixels containing an active area of 1080 lines×1920 pixels and that the signal is output from latch 168 is even, and in case that the input video signal is in image format F of 1125 lines×2280 pixels containing an active area of 1080 lines×1920 pixels and that the signal is output from latch 168 is 0 or 5.

1080 process vertical sync signal for the respective image formats A–F output from 1080 process vertical sync signal generator 160 are shown in FIG. 16.

Input frequency sync signal IFS, input vertical sync signal IVS, process vertical sync signal PVS, and display vertical sync signal DVS appearing in sync signal generator 100 according to the display format and image format of the input video signal are shown in FIGS. 19A–20F.

Figure 19A:
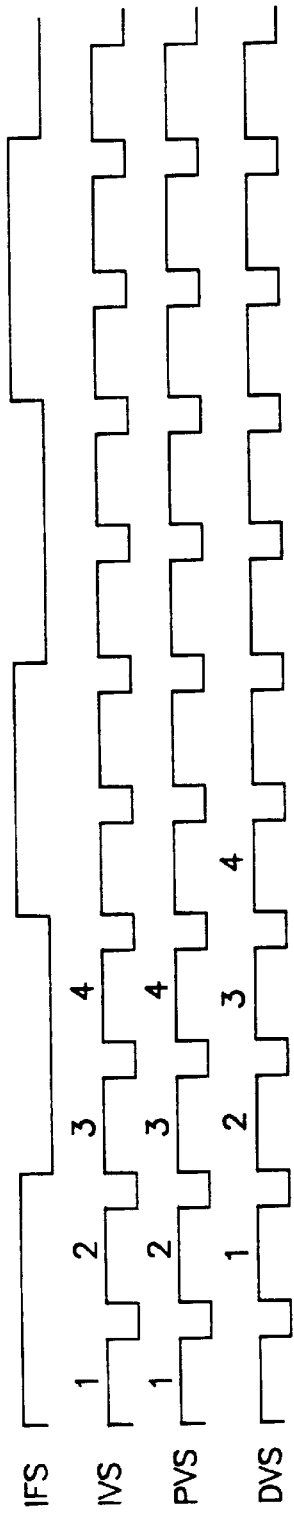
FIGS. 19A–19F are waveform diagrams of sync signals corresponding to the respective image formats in a sequential scanning display mode.

In case that the display format is the sequential scanning mode and the input video signal is in image format A, input frequency sync signal IFS, input vertical sync signal IVS, process vertical sync signal PVS, and display vertical sync signal DVS are shown in FIG. 19A.

Figure 19B:
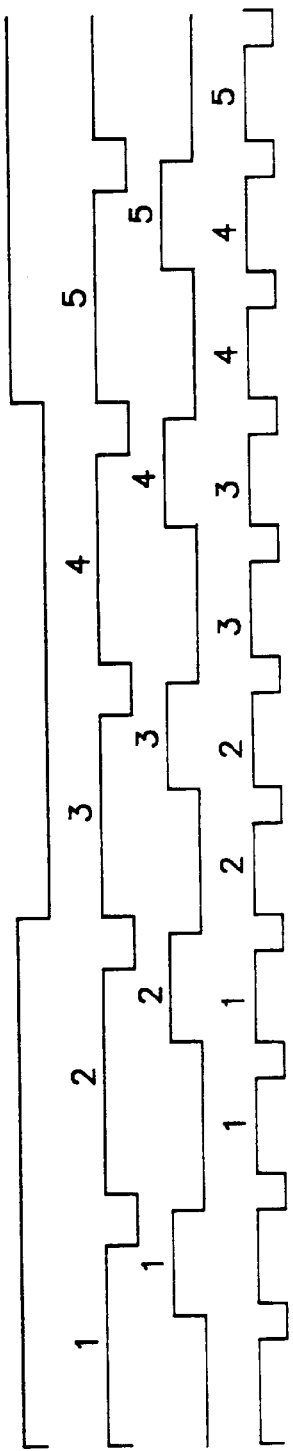

In case that the display format is the sequential scanning mode and the input video signal is in image format B, input frequency sync signal IFS, input vertical sync signal IVS, process vertical sync signal PVS, and display vertical sync signal DVS are shown in FIG. 19B.

Figure 19C:
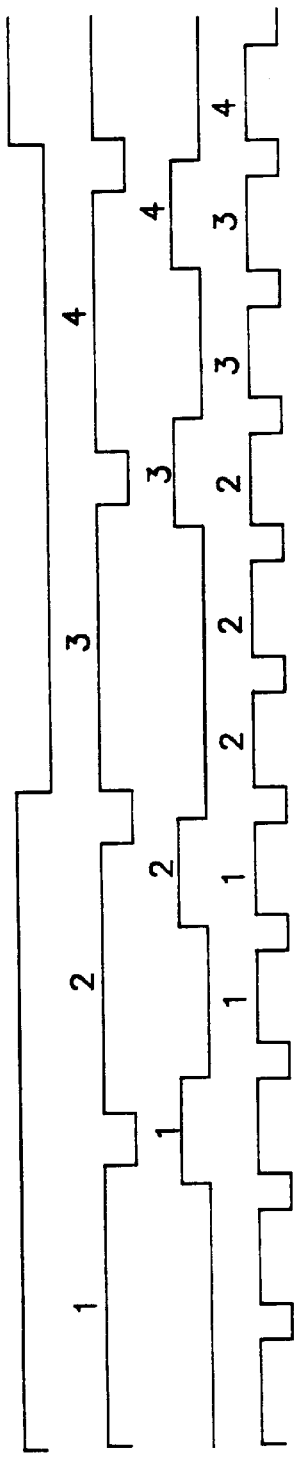

In case that the display format is the sequential scanning mode and the input video signal is in image format C, input frequency sync signal IFS, input vertical sync signal IVS, process vertical sync signal PVS, and display vertical sync signal DVS are shown in FIG. 19C.

Figure 19D:
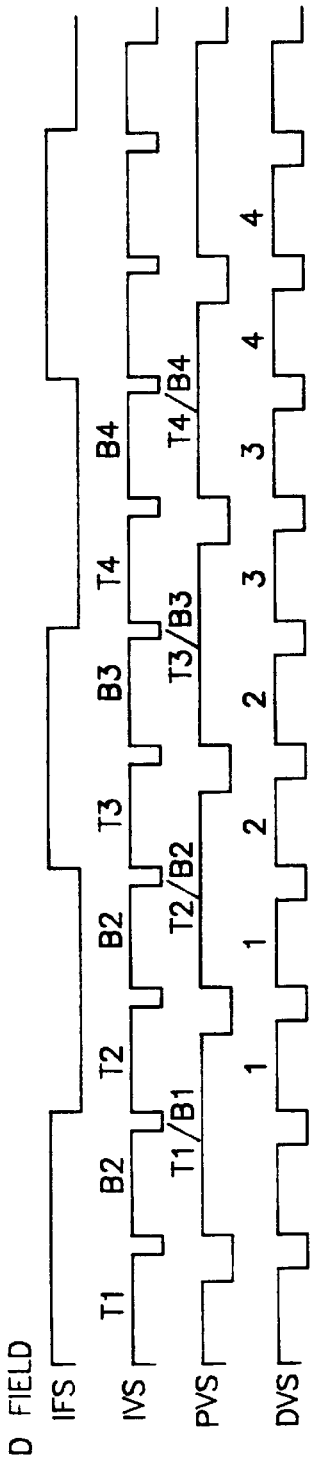

In case that the display format is the sequential scanning mode and the input video signal is in image format D, input frequency sync signal IFS, input vertical sync signal IVS, process vertical sync signal PVS, and display vertical sync signal DVS are shown in FIG. 19D.

Figure 19E:
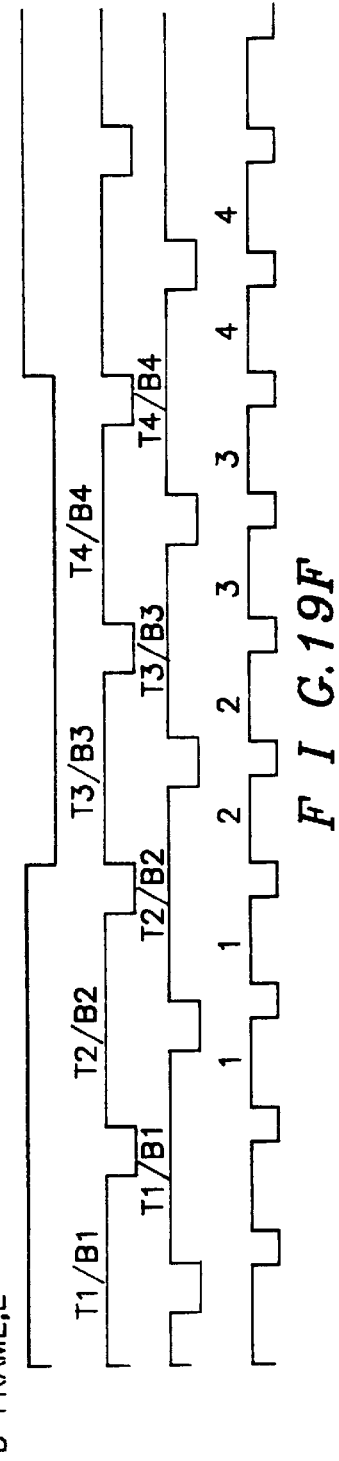

In case that the display format is the sequential scanning mode and the input video signal is in image format E, input frequency sync signal IFS, input vertical sync signal IVS, process vertical sync signal PVS, and display vertical sync signal DVS are shown in FIG. 19E.

Figure 19F:
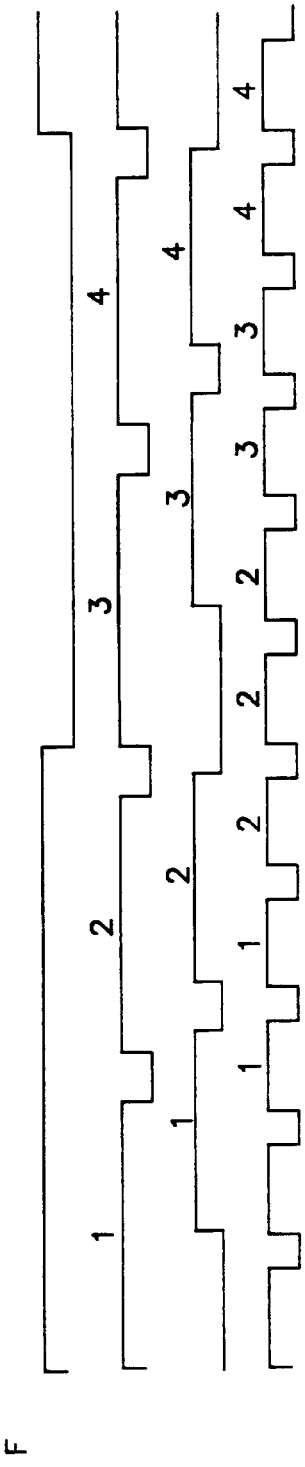

In case that the display format is the sequential scanning mode and the input video signal is in image format F, input frequency sync signal IFS, input vertical sync signal IVS, process vertical sync signal PVS, and display vertical sync signal DVS are shown in FIG. 19F.

In case that the display format is the interlaced scanning mode and the input video signal is in image format A, input frequency sync signal IFS, input vertical sync signal IVS, process vertical sync signal PVS, and display vertical sync signal DVS are shown in FIG. 20A.

In case that the display format is the interlaced scanning mode and the input video signal is in image format B, input frequency sync signal IFS, input vertical sync signal IVS, process vertical sync signal PVS, and display vertical sync signal DVS are shown in FIG. 20B.

In case that the display format is the interlaced scanning mode and the input video signal is in image format C, input frequency sync signal IFS, input vertical sync signal IVS, process vertical sync signal PVS, and display vertical sync signal DVS are shown in FIG. 20C.

In case that the display format is the interlaced scanning mode and the input video signal is in image format D, input frequency sync signal IFS, input vertical sync signal IVS, process vertical sync signal PVS, and display vertical sync signal DVS are shown in FIG. 20D.

In case that the display format is the interlaced scanning mode and the input video signal is in image format E, input frequency sync signal IFS, input vertical sync signal IVS, process vertical sync signal PVS, and display vertical sync signal DVS are shown in FIG. 20E.

In case that the display format is the interlaced scanning mode and the input video signal is in image format F, input frequency sync signal IFS, input vertical sync signal IVS, process vertical sync signal PVS, and display vertical sync signal DVS are shown in FIG. 20F.

Referring to FIG. 21, controller 24 of blanking area converting portion 20 comprises a rising edge detector 241 for detecting the rising edge of the input vertical sync signal output from decoder 10, and outputting top and bottom FIFO write reset signals, a FIFO write masking portion 242 for processing write masking, using the image format information and picture structure information output from decoder 10, a write enable signal generator 243 for outputting top and bottom FIFO write enable signals for controlling the writing of FIFOs 21 and 22, using the input vertical sync signal and input line sync signal output from decoder 10 and the signal output from FIFO write masking portion 242, a rising edge detector 244 for detecting the rising edge of the process vertical sync signal PVS output from sync signal generator 100, and outputting top and bottom FIFO read reset signals, a FIFO read masking portion 245 for processing read masking according to the image format information output from decoder 10, and a read enable signal generator 246 for outputting top and bottom FIFO read enable signals for controlling the reading of FIFOs 21 and 22 and the selection signal for controlling multiplexer 23 of FIG. 1, using the process vertical sync signal PVS and process line sync signal PLS output from sync signal generator 100 and the signal output from FIFO read masking portion 245.

Write enable signal generator 243 comprises an AND gate 2431 for logically multiplying the input vertical sync signal and input line sync signal output from decoder 10, a flipflop 2432 for taking the input line sync signal output from decoder 10 as the clock input, an inverter 2433 for inverting the signal output from flipflop 2432, an AND gate 2434 for logically multiplying the signal output from flipflop 2432 and the output signal Tand output from FIFO write masking portion 242, an AND gate 2435 for logically multiplying the signal output from inverter 2433 and the output signal Band output from FIFO write masking portion 242, an OR gate 2436 for logically summing the signal output from AND gate 2434 and the output signal Tor output from FIFO write masking portion 242, an OR gate 2437 for logically summing the signal output from AND gate 2435 and the output signal Bor output from FIFO write masking portion 242, an AND gate 2438 for logically multiplying the signals output from AND gate 2431 and OR gate 2436, and outputting a top FIFO write enable signal, and an AND gate 2439 for logically multiplying the signals output from AND gate 2431 and OR gate 2437, and outputting a bottom FIFO write enable signal.

Figures 22, 23, 24, 25:
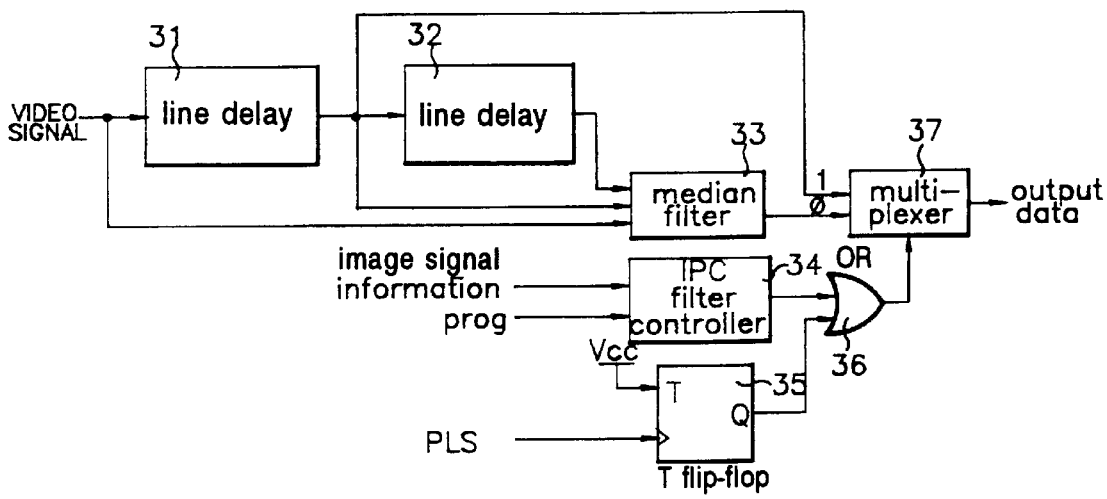
FIG. 22 shows operation states of the FIFO write masking portion of FIG. 21.
FIG. 23 shows operation states of the FIFO read masking portion of FIG. 21.
FIG. 24 is a detailed circuit diagram of the IPC portion of FIG. 1.
FIG. 25 shows operation states of the IPC bypass controller of FIG. 24.

As shown in FIG. 22, in FIFO write masking portion 242, output signals Tand, Tor, Band and Bor become 1, 1, 0 and 0 regardless of the picture structure, in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines×4000 pixels containing an active area of 720 lines×1280 pixels. Output signals Tand, Tor, Band and Bor become 1, 1, 0 and 0 in case that the input video signal is in image format D of 562/563 lines×2240 pixels containing an active area of 540 lines×1920 pixels and that the picture structure is bottom field.

In addition, output signals Tand, Tor, Band and Bor become 1, 0, 1 and 0 in case that the input video signal is in image format D of 562/563 lines×2240 pixels containing an active area of 540 lines×1920 pixels and that the picture structure is frame. Output signals Tand, Tor, Band and Bor become 1, 0, 1 and 0 in case that the input video signal is in image format E of 1125 lines×2240 pixels containing an active area of 1080 lines×1920 pixels. Output signals Tand, Tor, Band and Bor become 1, 0, 1 and 0 in case that the input video signal is in image format F of 1125 lines×2280 pixels containing an active area of 1080 lines×1920 pixels.

Read enable signal generator 246 comprises an AND gate 2461 for logically multiplying the process vertical sync signal PVS and process line sync signal PLS output from sync signal generator 100, a flipflop 2462 for taking the process vertical sync signal PVS output from sync signal generator 100 as the clock input, an OR gate 2463 for logically summing the signals output from flipflop 2462 and FIFO read masking portion 245, an inverter 2464 for inverting the signal output from OR gate 2463, an AND gate 2465 for logically multiplying the signals output from AND gate 2461 and OR gate 2463, and an AND gate 2467 for logically multiplying the signals output from AND gate 2461 and inverter 2464.

As shown in FIG. 23, FIFO read masking portion 245 outputs 1 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines×4000 pixels containing an active area of 720 lines×1280 pixels. FIFO read masking portion 245 outputs 0 in case that the input video signal is in image format D of 562/563 lines×2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels.

FIFO memories 21 and 22 of blanking area converter 20 is constructed to store and read out only data corresponding to the active area. For this purpose, using the signal in which the input vertical sync signal IVS and input line signal ILS output from decoder 10 are logically multiplied in AND gate 2431, the write enable signal of FIFO memories 21 and 22 is made. At the same time, using the signal in which the process vertical sync signal PVS and input line signal PLS are logically multiplied in AND gate 2461, the read enable signal of FIFO memories 21 and 22 is made.

In case that the input video signal is in image format A, B or C of an active area of 720 lines×1280 pixels, the video data is stored only in FIFO memory 21. In case that the the image format is interlaced scanning mode (D field structure), the video data of top field is stored in FIFO memory 21, and the video data of bottom field is stored in FIFO memory 22.

In case that the image format is D of an active area of 1920 pixels and 1080 lines and frame structure is E or F, the video data is alternately stored in FIFO memories 21 and 22 in units of line.

In case that the input video signal is in image format D and that the picture structure information output from decoder 10 indicates frame, the odd lines belong to the top field and the even lines to the bottom field. Top and bottom FIFO write and read enable signals are made in such a manner that, when stored in FIFO memories 21 and 22, in case of top field, the overall field data input belongs to the top field, and that in case of bottom field, the overall field data input belongs to the bottom field.

In case that the input video signal is in image format D and that the picture structure information output from decoder 10 indicates field, the top and bottom FIFO read enable signals are made in such a manner that the input video data is read out alternately from FIFO memories 21 and 22 in units of line. By doing so, the video data passing through FIFO memories 21 and 22 always forms the frame structure.

Here, if the top FIFO read enable signal is 1 and therefore used as the selection signal of multiplexer 23, data read out from FIFO memory 21 is supposed to be selected and output from multiplexer 23. If the top FIFO write enable signal is 0, data read out from FIFO memory 22 is supposed to be selected and output from multiplexer 23.

The signal corresponding to the rising edge of input vertical sync signal IVS detected and output from rising edge detector 241 is used as the signal for resetting the writing of FIFO memories 21 and 22 so that new video data is stored from the initial address of FIFO memories 21 and 22 for every frame. Here, in case that the input video signal is in image format D and field structure, new video data is stored from the initial address of FIFO memories 21 and 22 for every field.

The signal corresponding to the rising edge of process line sync signal PLS detected and output from rising edge detector 244 is used as the signal for resetting the reading of FIFO memories 21 and 22 so that new video data is read out from the initial address of FIFO memories 21 and 22 for every frame. Through this procedure, the blanking area of the input video signal is converted as shown in FIG. 3.

Referring to FIG. 24, IPC portion 30 comprises a line delay 31 for delaying the video signal output from multiplexer 23 of blanking converter 20 in units of line, a line delay 32 for delaying the video signal output from line delay 31 in units of line, a median filter 33 for median-filtering the video signal output from blanking converter 20 and line delays 31 and 32, an IPC bypass controller 34 for controlling the IPC bypass of the video signal output from blanking converter 20 according to image format information and display format output from decoder 10, a T flipflop 35 for taking process line sync signal PLS output from sync signal generator 100 as the clock input and to the input port of which power Vcc is coupled, an OR gate 36 for logically summing the signals output from IPC bypass controller 34 and T flipflop 35, and a multiplexer 37 for selecting and outputting the video signals output from line delay 31 and median filter 33 under the control of the signal output from OR gate 36.

As shown in FIG. 25, IPC bypass controller 34 outputs 1 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, in case that the input video signal is in image format C of 787/788 lines×4000 pixels containing an active area of 720 lines×1280 pixels, in case that the input video signal is in image format D of 562/563 lines×2240 pixels containing an active area of 540 lines×1920 pixels and that the display format is interlaced scanning mode, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels. IPC bypass controller 34 outputs 0 in case that the input video signal is in image format D of 562/563 lines×2240 pixels containing an active area of 540 lines×1920 pixels and that the display format is sequential scanning mode. The operation of IPC 30 will be described with reference to FIGS. 26 and 27.

Figure 26:
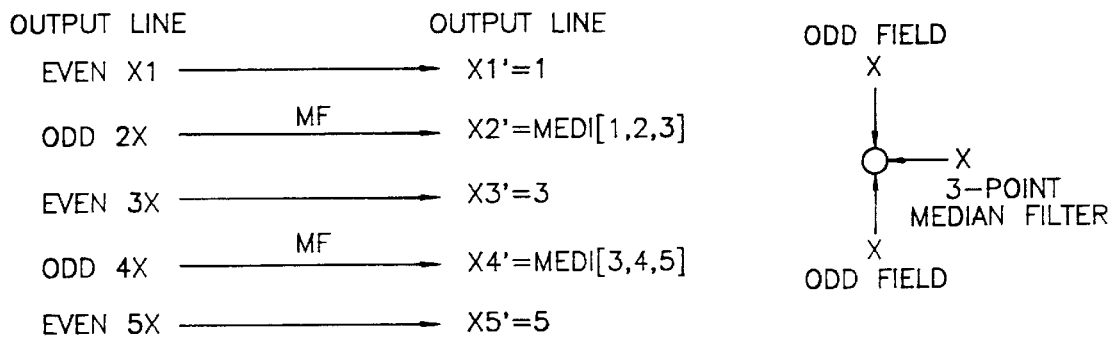
FIG. 26 shows the image data processing state of FIG. 24.

The video signal output from multiplexer 23 of blanking area converter 20 is delayed in units of line through line delays 31 and 32, and filtered in 3-point median filter 33 using the upper and lower lines and the pixel value at the same position of the next field, as shown in FIG. 26. The result is output to multiplexer 37.

Figure 27:
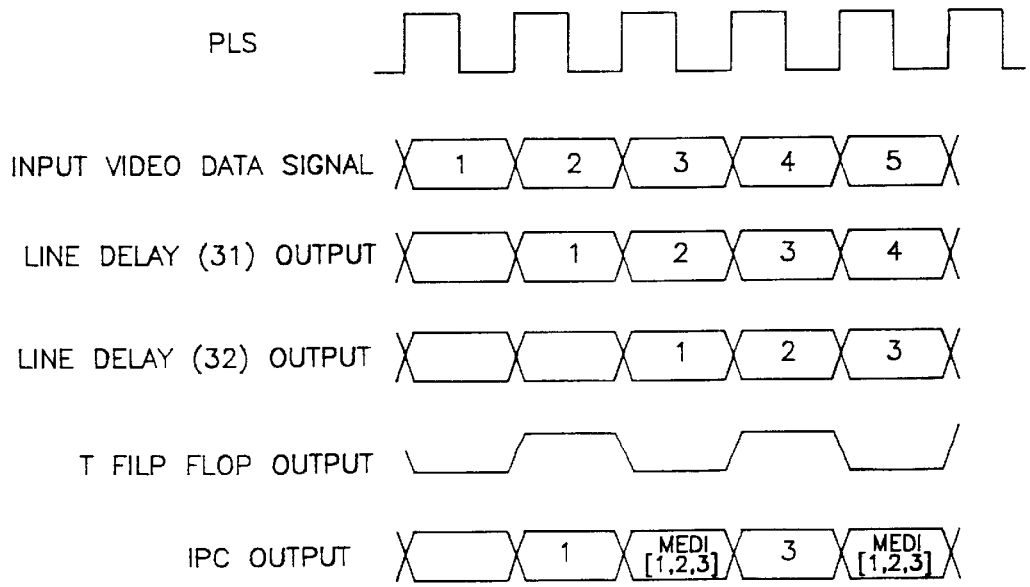
FIG. 27 shows signal waveforms present at the respective portions of FIG. 24.

Process line sync signal PLS is input to the T port of T flipflop 35, and output as a signal having two times the period of process line sync signal PLS, as shown in FIG. 27.

The signals output from T flipflop 35 and IPC bypass controller 34 are logically summed in OR gate 36 to control the selection of multiplexer 37. In other words, according to the signal output from OR gate 36, multiplexer 37 selects one of the signals output from line delay 31 and median filter 33, and outputs it to IPC portion 30.

Only in case that the video signal input by IPC bypass controller 34 is in image format D with interlaced scanning mode, and in the display format of sequential scanning mode, multiplexer 37 alternately selects and outputs the signals output from median filter 33 and line delay 31 according to the signal output from T flipflop 35. In other cases, that is, in case that the input video signal is in image format A–F or that the video signal input is in image format D with interlaced scanning mode, the signal is bypass so that multiplexer 37 continuously selects and outputs only the signal output from line delay 31.

Accordingly, in case that the input video signal is in image format D with interlaced scanning mode and that the display format is sequential scanning mode, the format is converted into sequential scanning mode in IPC portion 30.

Referring to FIG. 28, VDS portion 40 comprises a line delay 41 for delaying the video signal output from IPC portion 30 in units of line, an interline pixel average calculator 42 for calculating the average of the video signals output from IPC portion 30 and line delay 41, a multiplexer 44 for selecting and outputting one of the signals output from line delay 41, interline pixel average calculator 42, and the ground, a VDS bypass controller 45 for controlling VDS bypass according to the image format information output from decoder 10, a 2-bit counter 46 for counting process line sync signal PLS output from sync signal generator 100, a multiplexer controller 43 for controlling multiplexer 44 according to the 2-bit signals output from VDS bypass controller 45 and 2-bit counter 46, a NAND gate 47 for logically multiplying the upper bit signal output from 2-bit counter 46 and the inverted lower-bit signal, and outputting the result to the load signal input port LDn of 2-bit counter 46, and an OR gate 48 for logically summing the signals output from VDS bypass controller 45 and NAND gate 47, and outputting a VDS read enable signal to frame rate converting portion 80.

Interline pixel average calculator 42 comprises an adder 421 for adding the video signals output from IPC portion 30 and line delay 41, and a ½ multiplier 422 for multiplying the signal output from adder 421 by ½.

Multiplexer controller 43 comprises an inverter 433 for inverting the signal output from VDS bypass controller 45, an AND gate 432 for logically multiplying the upper-bit signal output from 2-bit counter 46 and the signal output from inverter 433, and an AND gate 431 for logically multiplying the lower-bit signal output from 2-bit counter 46 and the signal output from inverter 433.

As shown in FIG. 29, VDS bypass controller 45 outputs 1 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines× 4000 pixels containing an active area of 720 lines×1280 pixels. VDS bypass controller 45 outputs 0 in case that the input video signal is in image format D of 562/563 lines× 2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels. The operation of VDS portion 40 will be explained with reference to FIGS. 30 and 31.

Figure 30:
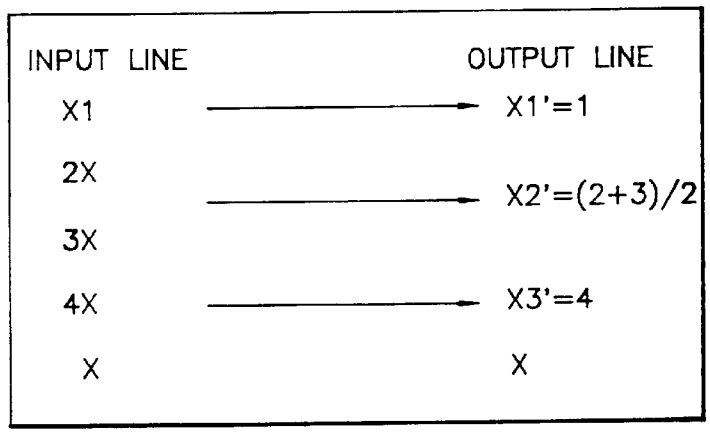
FIG. 30 shows the image data processing state of FIG. 28.

The video signal output from IPC portion 30 is delayed in units of line through line delay 41, and then input to interline average calculator 42 along with the video signal output from IPC portion 30. As shown in FIG. 30, the pixel values at the same position of the upper and lower lines are calculated in interline pixel average calculator 42.

The video signals output from line delay 41 and interline pixel average calculator 42 are selected and output in multiplexer 44 under the control of multiplexer controller 43.

Process line sync signal PLS is counted in 2-bit counter 46. The upper and lower bits QB and QA output from 2-bit counter 46 are processed through inverter 49 and NAND gate 47, and input to the clear signal input port Cl of 2-bit counter 46 in order to clear 2-bit counter 46. Therefore, 2-bit counter counts 3 in total, from 0 to 2, taking process line sync signal PLS as the clock, and outputs the signal shown in FIG. 31.

Figure 31:
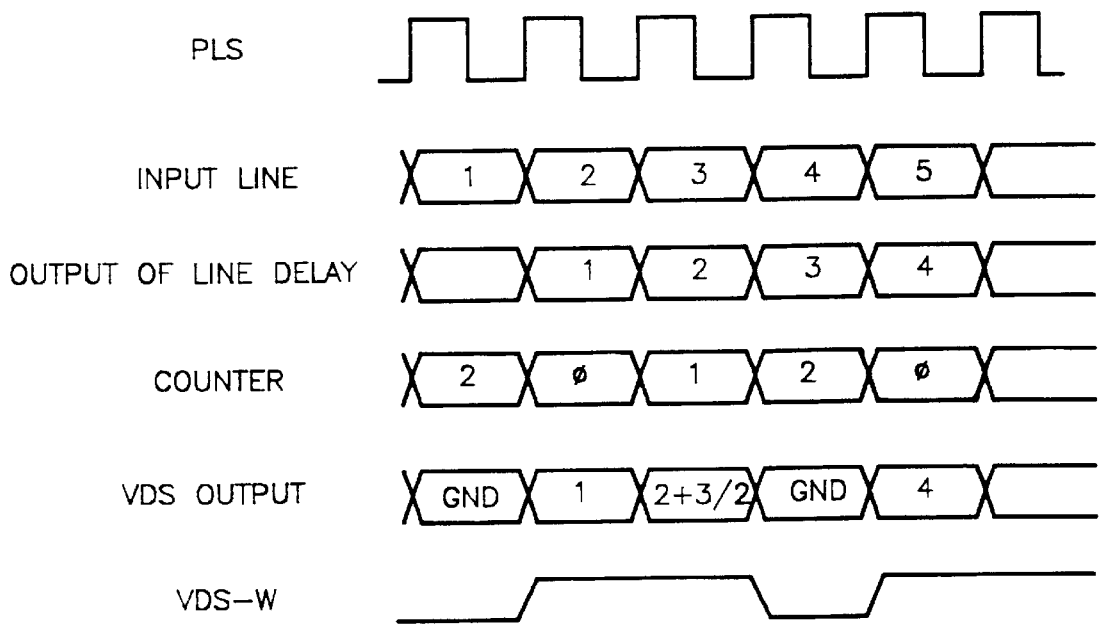
FIG. 31 shows signal waveforms present at the respective portions of FIG. 28.

The signal output from 2-bit counter 46 through inverter 49 and NAND gate 47 and the signal output from VDS bypass controller 45 are logically summed in OR gate 48. As shown in FIG. 31, the result is output to controller 84 of frame rate converting portion 80 as VDS read enable signal VDS-W.

According to multiplexer controller 43, the video signal output from multiplexer 44 appears as shown in FIG. 31. In case the input video signal is in image format D, E or F, 3:2 down sampling is performed vertically according to VDS bypass controller 45.

In other words, in case the input video signal is in image format D, E or F, a single clock is used. In this state, VDS read enable signal VDS-W is input to controller 84 so that only in HIGH level, it is written in FIFO memory 81 of frame rate converting portion 80. When it is continuously read in the active area of the display format, 3:2 down sampling is completed.

In other cases that the image format is A, B or C, down sampling is not performed according to VDS bypass controller 45, and the signal is output from line delay 41 without change through multiplexer 44.

Referring to FIG. 32, PIC portion 50 comprises a line delay 51 for delaying the video signal output from IPC portion 30 in units of line, an interline pixel weight average calculator 52 for multiplying the video signal output from PIC portion 30 and line delay 51 by a corresponding weight to thereby calculate its weight average, an interline pixel weight average calculator 53 for multiplying the video signal output from PIC portion 30 and line delay 51 by a corresponding weight to thereby calculate its weight average, a multiplexer 54 for selecting and outputting one of the signals output from line delay 51, interline pixel weight average calculator 52 and 53, and the ground, a PIC bypass controller 56 for controlling PIC bypass according to the image format information output from decoder 10, a 2-bit counter 59 for counting process line sync signal PLS output from sync signal generator 100, a multiplexer controller 55 for outputting a signal for controlling multiplexer 54, using the signals output from PIC bypass controller 56 and 2-bit counter 59, a multiplexer 57 for selecting and outputting one of the signals output from line delay 51, interline pixel weight average calculator 52 and 53, and the ground, a multiplexer controller 58 for outputting a signal for controlling multiplexer 57, using the signals output from PIC bypass controller 56 and 2-bit counter 59, and a write enable signal generator 591 for generating top and bottom PIC write enable signals, and outputting them to frame rate converting portion 80, using the signals output from 2-bit counter 59 and PIC bypass controller 56.

Interline pixel weight average calculator 52 comprises a ⅓ multiplier 521 for multiplying the signal output from IPC portion 30 by ⅓, a ⅔ multiplier 522 for multiplying the signal output from line delay 51 by ⅔, and an adder 523 for adding the video signals output from ⅓ multiplier 521 and ⅔ multiplier 522.

Interline pixel weight average calculator 53 comprises a ⅔ multiplier 531 for multiplying the signal output from IPC portion 30 by ⅔, a ⅓ multiplier 532 for multiplying the signal output from line delay 51 by ⅓, and an adder 533 for adding the video signals output from ⅔ multiplier 531 and ⅓ multiplier 532.

Multiplexer controller 55 comprises an inverter 551 for inverting the signal output from PIC bypass controller 56, an AND gate 552 for logically multiplying the signal output from inverter 551 by the upper-bit signal output from 2-bit counter 59, and an AND gate 553 for logically multiplying the signal output from inverter 551 by the lower-bit signal output from 2-bit counter 59.

Multiplexer controller 58 comprises an OR gate 581 for logically summing the signal output from PIC bypass controller 56 and the upper-bit signal output from 2-bit counter 59, and an AND gate 582 for inverting the signal output from PIC bypass controller 56 and logically multiplying the signal by the lower-bit signal output from 2-bit counter 59.

Figures 33, 34, 35:
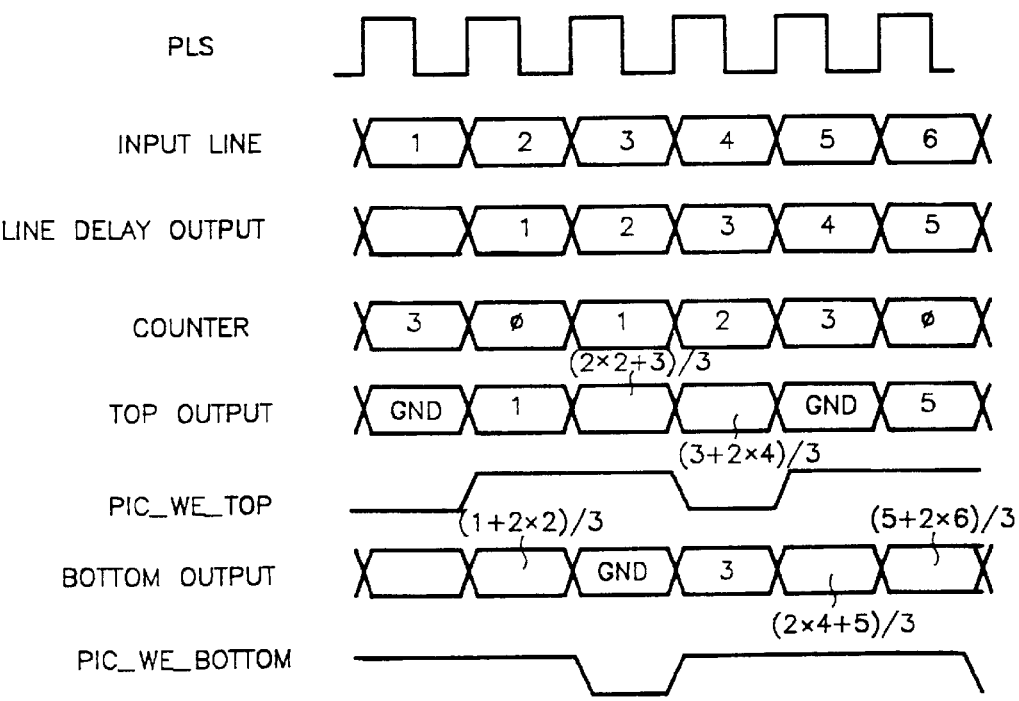
FIG. 33 shows operation states of the PIC bypass controller of FIG. 32.
FIG. 34 shows the image data processing state of FIG. 32.
FIG. 35 shows signal waveforms present at the respective portions of FIG. 32.

As shown in FIG. 33, PIC bypass controller 56 outputs. 0 in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines× 4000 pixels containing an active area of 720 lines×1280 pixels. PIC bypass controller 56 outputs 1 in case that the input video signal is in image format D of 562/563 lines× 2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels.

Write enable signal generator 591 comprises a NAND gate 593 for negatively and logically multiplying the upper and lower bit signals output from 2-bit counter 59, an inverter 592 for inverting the upper-bit signal output from 2-bit counter 59, a NAND gate 594 for negatively and logically multiplying the lower bit signal output from 2-bit counter 59 and the signal output from inverter 592, an OR gate 595 for logically summing the signal output from PIC bypass controller 56 and the signal output from NAND gate 593, and outputting the result as the top PIC write enable signal, and an OR gate 596 for logically summing the signal output from PIC bypass controller 56 and the signal output from NAND gate 594, and outputting the result as the bottom PIC write enable signal. The operation of PIC portion 50 will be described with reference to FIGS. 34 and 35.

The video signal output from IPC portion 30 is delayed in units of line through line delay 51, and then input to interline weight average calculator 52 along with the video signal output from IPC portion 30. In the calculator, the input is multiplied by a corresponding weight and then output to multipliers 54 and 57. As shown in FIG. 34, a corresponding pixel of the upper line output from line delay 51 is multiplied by ⅔. A corresponding pixel of the lower line output from IPC portion 30 is multiplied by ⅓. The multiplication results are summed in adder 523 and output to multiplexer 54. A corresponding pixel of the upper line output from line delay 51 is multiplied by ⅓. A corresponding pixel of the lower line output from IPC portion 30 is multiplied by ⅔. The multiplication results are summed in adder 533 and output to multiplexers 54 and 57.

Process line sync signal PLS is input to 2-bit counter 59 as the clock, and counts 4 in total, from 0 to 3.

According to image formats A–F of the input video signal, the signal output from PIC bypass controller 56 is inverted in inverter 551 and input to AND gates 552 and 553 along with the upper and lower bits QB and QA output from 2-bit counter 59. The signals output from AND gates 552 and 553 control multiplexer 54's selection so as to output video data of top field. According to the signals output from AND gates 552 and 553, multiplexer 54 sequentially selects the signals output from line delay 51, adder 523, adder 533 and the ground so as to output the video data of top field.

The signal inverted and output from inverter 551 is input to AND gate 582 along with the lower bit QA output from 2-bit counter 59. The inputs are logically multiplied. The signal output from PIC bypass controller 56 is input to OR gate 581 along with the upper bit QB output from 2-bit counter 59. The inputs are logically summed. The signals output from AND gate 582 and OR gate 581 control multiplexer 57's selection so as to output video data of bottom field. According to the signals output from AND gate 582 and OR gate 581, multiplexer 57 sequentially selects the signals input from adder 533, line delay 51, adder 523, and the ground so as to output the video data of bottom field.

After this processing, the top and bottom field video data selected and output from multiplexers 54 and 57 are shown in FIG. 35.

The upper and lower bits QA and QB output from 2-bit counter 59 are negatively and logically multiplied in NAND gate 593, and logically added to the signal output from PIC bypass controller 56 in OR gate 595. This result is output to controller 84 of frame rate converting portion 80 as top PIC write enable signal PIC-W-T.

The upper bit QB output from 2-bit counter 59 and inverted through inverter 592 is input to NAND gate 594 along with the lower bit QA output from 2-bit counter 59 for negative logic multiplication, and logically added to the signal output from PIC bypass controller 56 in OR gate 596. This result is output to controller 84 of frame rate converting portion 80 as bottom PIC write enable signal PIC-W-B, as shown in FIG. 35.

In case the input video signal is in image format A, B or C, 4:3 down sampling is performed vertically, coinciding with the top and bottom fields, according to VDS bypass controller 45.

In other words, in case the input video signal is in image format A, B or C, top and bottom PIC write enable signals PIC-W-T and PIC-W-B are input to controller 84 of FIG. 1 so that only in HIGH level, they are written in FIFO memories 81 and 82 of frame rate converting portion 80. When they continuously read in the active area of the display format, 4:3 down sampling is completed.

In other cases that the image format is D, E or F, down sampling is not performed according to PIC bypass controller 56, and the signals are output from line delay 51 without change through multiplexers 54 and 57.

Referring to FIG. 36, HDS portion 70 comprises a latch 71 for delaying the video signal output from multiplexer 60 in units of pixel, an intraline interpixel average calculator 72 for calculating the average of the video signals output from multiplexer 60 of FIG. 1 and latch 71, a multiplexer 73 for selecting and outputting one of the signals output from latch 71, intraline interpixel average calculator 42, and the ground, an HDS bypass controller 75 for controlling HDS bypass according to the image format information and display format output from decoder 10, a multiplexer controller 74 for controlling multiplexer 73, using the signal output from HDS bypass controller 75, a 2-bit counter 76 for counting a reference clock, an inverter 77 for inverting the lower-bit signal output from 2-bit counter 76, a NAND gate 78 for logically multiplying the signal output from inverter 77 and the upper bit signal output from 2-bit counter 76, and outputting the result to the clear signal input port C1 of 2-bit counter 76, and an OR gate 79 for logically summing the signals output from HDS bypass controller 75 and NAND gate 78, and outputting a HDS write enable signal to frame rate converting portion 80.

Intraline interpixel average calculator 72 comprises an adder 721 for adding the signals output from multiplexer 60 and latch 71, and a ½ multiplier 722 for multiplying the signal output from adder 721 by ½.

As shown in FIG. 37, HDS bypass controller 75 outputs 1 regardless of the display format, in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines×4000 pixels containing an active area of 720 lines×1280 pixels. HDS bypass controller 75 outputs 1 in case that the display format is interlaced scanning mode, in case that the input video signal is in image format D of 562/563 lines×2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels.

HDS bypass controller 75 outputs 0 in case that the display format is sequential scanning mode, in case that the input video signal is in image format D of 562/563 lines× 2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels. The operation of HDS portion 70 will be explained with reference to FIGS. 38 and 39.

The video signal output from multiplexer 60 is delayed in units of pixel through latch 71, and then input to intraline interpixel average calculator 72 along with the video signal output from multiplexer 60. The inputs are calculated and output to multiplexer 73. As shown in FIG. 38, the average of the pixels output from latch 71 and multiplexer 60 is calculated through adder 721 and ½ multiplexer 722, and output to multiplexer 73.

An externally input reference clock is input to 2-bit counter 76 as its clock so that 3 is counted in total from 0 to 2. The lower bit QA output from 2-bit counter 76 and inverted in inverter 77 is negatively and logically multiplied in NAND gate 78 along with the upper bit QB output from 2-bit counter 76. The result is input to the clear signal input port C1 of 2-bit counter 76 so as to clear it. The signal output from 2-bit counter 76 is as shown in FIG. 39.

According to image formats A–F of the input video signal and display format signal prog, the signal output from HDS bypass controller 75 is inverted in inverter 743 and input to AND gates 742 and 741 along with the upper and lower bits QB and QA output from 2-bit counter 76 for logical multiplication. The signals output from AND gates 742 and 741 control multiplexer 73's selection and outputs video data. According to the signals output from AND gates 742 and 741, multiplexer 73 sequentially selects the signals input from latch 71, ½ multiplier 722 and the ground so as to output the video data, which is shown in FIG. 39.

The signal output from NAND gate 78 is logically added to the signal output from HDS bypass controller 75 in OR gate 79. This result is output to controller 84 of frame rate converting portion 80 as HDS write enable signal HDS-W, as shown in FIG. 39.

In case that the input video signal is in image format D, E or F and that the display format is sequential scanning mode, 3:2 down sampling is performed horizontally according to HDS bypass controller 75.

In other words, in case the input video signal is in image format D, E or F, HDS write enable signal HDS-W is input to controller 84 so that only in HIGH level, it is written in FIFO memory 81 of frame rate converting portion 80. When it is continuously read in the active area of the display format, 3:2 down sampling is completed.

In other cases that the image format is A, B or C, down sampling is not performed according to HDS bypass controller 45, and the signal is output from latch 71 without change through multiplexer 73.

Referring to FIG. 40, controller 84 of frame rate converting portion 80 comprises a rising edge detector 841 for detecting the rising edge of the process vertical sync signal PVS output from sync signal generator 100, and outputting top and bottom FIFO write reset signals FIFO2-T-W and FIFO2-B-W, a write enable signal generator 842 for outputting top and bottom FIFO write enable signals FIFO2-T-W and FIFO2-B-W for controlling the writing of FIFO memories 81 and 82 according to the display format, using process vertical sync signal PVS and process line sync signal PLS output from sync signal generator 100, top and bottom PIC write enable signals PIC-W-T and PIC-W-B output from PIC portion 50, VDS write enable signal VDS-W output from VDS portion 40, and HDS write enable signal HDS-W output from HDS portion 70, a rising edge detector 843 for detecting the rising edge of display vertical sync signal DVS output from sync signal generator 100, and outputting top and bottom FIFO read reset signals FIFO2-T-RR and FIFO2-B-RR, and a read enable signal generator 844 for outputting top and bottom FIFO read enable signals FIFO2-T-R and FIFO2-B-R for controlling the reading of FIFOs 81 and 82 and a selection signal M3S for controlling multiplexer 83, using display vertical sync signal DVS and display line sync signal DLS output from sync signal generator 100 and the the control signal output from HUS portion 90.

Write enable signal generator 842 comprises a two-line delay 8421 for two-line delaying process vertical sync signal PVS output from sync signal generator 100, an AND gate 8422 for logically multiplying process line sync signals output from two-line delay 8421 and sync signal generator 100, multiplexer 8423 for selecting and outputting one of top PIC write enable signal PIC-W-T output from PIC portion 50 of FIG. 1 and VDS write enable signal VDS-W output from VDS portion 40 according to the display format, an AND gate 8424 for logically multiplying the signals output from AND gate 8422 and multiplexer 8423, a latch 8425 for latching the signal output from AND gate 8424, an AND gate 8426 for logically multiplying HDS write enable signal HDS-W output from HDS portion 8426 and the signal output from latch 8425, and outputting top FIFO write enable signal FIFO-T-W, an inverter 8427 for inverting the sequential scanning signal indicative of the display format, an AND gate 8428 for logically multiplying bottom PIC write control signal PIC-W-B output from PIC portion 50 and the signal output from inverter 8427, and an AND gate 8429 for logically multiplying the signals output from AND gates 8422 and 8428, and outputting bottom FIFO write enable signal FIFO-B-W.

Read enable signal generator 844 comprises a T flipflop 8441 for taking display vertical sync signal DVS output from sync signal generator 100 as its clock input, an OR gate 8442 for logically summing the signal output from T flipflop 8441 and the sequential scanning signal indicative of the display format, an inverter 8443 for inverting the signal output from OR gate 8442, an AND gate 8444 for logically multiplying display vertical sync signal DVS output from sync signal generator 100 and display line sync signal DLS, an AND gate 8445 for logically multiplying the control signal output from HUS portion 90 and the signal output from AND gate 8444, an AND gate 8446 for logically multiplying the signals output from OR gate 8442 and AND gate 8445, and outputting selection signal M3S for controlling multiplexer 83 of FIG. 1 and top FIFO read enable signal FIFO2-T-R, and an AND gate 8447 for logically multiplying the signals output from inverter 8443 and AND gate 8445, and outputting bottom FIFO read enable signal FIFO2-B-R.

The rising edge of process vertical sync signal PVS produced from sync signal generator 100 is detected in rising edge detector 841 and output as top and bottom FIFO write reset signals FIFO2-T-W and FIFO2-B-W.

Process vertical sync signal PVS output from sync signal generator 100 is delayed by two lines in two-line delay 8421, and logically multiplied by process line sync signal PLS output from sync signal generator 100 in AND gate 8422.

Top PIC write enable signal PIC-W-T output from PIC portion 50 and VDS write enable signal VDS-W output from VDS portion 40 are selected and output from multiplexer 8423 according to input display format signal prog. If the input display format signal prog is 1, which indicates the sequential scanning mode, multiplexer 8423 selects and outputs VDS write enable signal VDS-W output from VDS portion 40. If the input display format signal prog is 0, which indicates the interlaced scanning mode, multiplexer 60 selects and outputs top PIC enable enable signal PIC-W-T output from PIC portion 50.

The signals output from AND gate 8422 and multiplexer 8423 are logically multiplied in AND gate 8424 and latched in latch 8425. The latched signal is logically multiplied by HDS write enable signal HDS-W in AND gate 8426, and then output as top FIFO write enable signal FIFO2-T-W for controlling the writing of FIFO memory 81.

Bottom PIC write enable signal PIC-W-B output from PIC 50 is logically multiplied by display format signal prog inverted in inverter 8427 in AND gate 8428. The result is logically multiplied by the signal output from AND gate 8422 in AND gate 8429, and then output as bottom FIFO write enable signal FIFO2-B-W for controlling the writing of FIFO memory 81.

The rising edge of display vertical sync signal DVS produced from sync signal generator 100 is detected in rising edge detector 843 and output as top and bottom FIFO read reset signals FIFO2-T-R and FIFO2-B-R.

Display vertical sync signal DVS output from sync signal generator 100 is input to the clock port of T flipflop 8441, and delayed and logically multiplied by display format signal prog in OR gate 8442.

Display vertical sync signal DVS and display line sync signal DLS output from sync signal generator are logically multiplied in AND gate 8444 and logically multiplied by HUS read enable signal HUS-R output from HUS portion 90 in AND gate 8445.

The signals output from OR gate 8442 and AND gate 8445 are logically multiplied in AND gate 8446, and output as top FIFO read enable signal FIFO2-T-R for controlling the reading of FIFO memory 81. The signal output from AND gate 8446 is used as a selection signal M3S for controlling multiplexer 83's selection.

The signal output from OR gate 8442 is inverted in inverter 8443, and logically multiplied by the signal output from AND gate 8446 in AND gate 8447. The result is output as bottom FIFO read enable signal FIFO2-B-R for controlling the reading of FIFO memory 82.

According to the signal output from controller 84, in case that the display format is the sequential scanning mode, video data is read out only from FIFO memory 81. In case that the display format is the interlaced scanning mode, top and bottom field video data are read out alternately from FIFO memories 81 and 82.

In case that the display format is sequential scanning mode, as shown in FIGS. 19A–19F, the video data of frame rate of 60, 30 or 24 Hz all is converted into the video data of 60 Hz frame rate. In case that the display format is interlaced scanning mode, as shown in FIGS. 20A–20F, the video data of frame rate of 60, 30 or 24 Hz all is converted into the video data of 60 Hz field rate.

Figure 41:
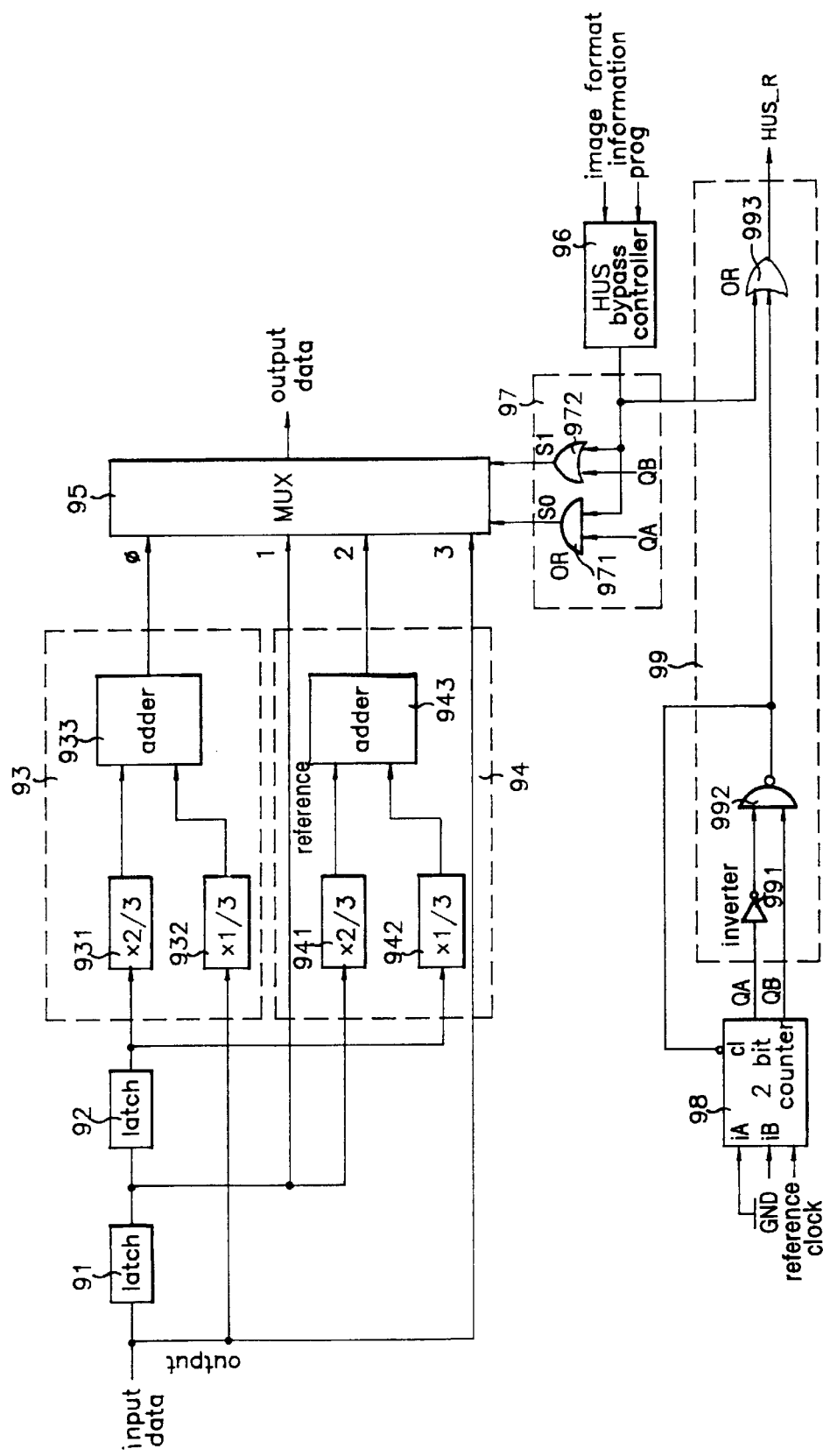
FIG. 41 is a detailed circuit diagram of the HUS portion of FIG. 1.

Referring to FIG. 41, HUS portion 90 comprises a latch 91 for delaying the video signal output from frame rate converting portion 80 in units of pixel, a latch 92 for delaying the video signal output from latch 91 in units of pixel, an intraline interpixel weight average calculator 93 for multiplying the video signals output from frame rate converting portion 80 and latch 92 by a corresponding weight to thereby calculate its weight average, an intraline interpixel weight average calculator 94 for multiplying the video signals output from latches 91 and 92 by a corresponding weight to thereby calculate its weight average, a multiplexer 95 for selecting and outputting one of the input data, and the signals output from latch 91, intraline interpixel weight average calculator 93 and 94, and frame rate converting portion 80, a HUS bypass controller 96 for controlling HUS bypass according to the image format information and display format output from decoder 10, a 2-bit counter 98 for counting an input reference clock, a multiplexer controller 97 for outputting a selection signal for controlling multiplexer 95, using the signals output from HUS bypass controller 96 and 2-bit counter 98, and a HUS read enable signal generator 99 for generating a HUS read enable signal and outputting the result to frame rate converting portion 80, using the signals output from HUS bypass controller 96 and 2-bit counter 98.

Intraline interpixel weight average calculator 93 comprises a ⅔ multiplier 931 for multiplying the signal output from latch 92 by ⅔, a ⅓ multiplier 932 for multiplying the video signal output from frame rate converting portion 80 by ⅓, and an adder 933 for adding the signals output from ⅔ multiplier 931 and ⅓ multiplier 932, and outputting the result to multiplexer 95.

Intraline interpixel weight average calculator 94 comprises a ⅔ multiplier 941 for multiplying the video signal output from latch 91 by ⅔, a ⅓ multiplier 942 for multiplying the video signal output from latch 92 by ⅓, and an adder 943 for adding the signal output from ⅓ multiplier 942, and outputting the result to multiplexer 95.

As shown in FIG. 42, HUS bypass controller 96 outputs 0 in case that the display format is the interlaced scanning mode, in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines×4000 pixels containing an active area of 720 lines×1280 pixels. HUS bypass controller 96 outputs 1 in case that the display format is the sequential scanning mode, in case that the input video signal is in image format A of 787/788 lines×1600 pixels containing an active area of 720 lines×1280 pixels, in case that the input video signal is in image format B of 787/788 lines×3200 pixels containing an active area of 720 lines×1280 pixels, and in case that the input video signal is in image format C of 787/788 lines×4000 pixels containing an active area of 720 lines×1280 pixels.

HUS bypass controller 96 outputs 1 in case that the input video signal is in image format D of 562/563 lines×2240 pixels containing an active area of 540 lines×1920 pixels, in case that the input video signal is in image format E of 1125 lines×2240 pixels containing an active area of 1080 lines×1920 pixels, and in case that the input video signal is in image format F of 1125 lines×2280 pixels containing an active area of 1080 lines×1920 pixels.

Multiplexer controller 97 comprises an OR gate 971 for logically summing the signal output from HUS bypass controller 96 and the lower-bit signal output from 2-bit counter 98, and an OR gate 972 for logically multiplying the signal output from HUS bypass controller 96 by the upper-bit signal output from 2-bit counter 98.

HUS read enable signal generator 99 comprises an inverter 991 for inverting the lower-bit signal output from 2-bit counter 98, a NAND gate 992 for negatively and logically multiplying the upper and lower bit signals output from 2-bit counter 98, an OR gate 993 for logically summing the signals output from NAND gate 992 and HUS bypass controller 96. The operation of HUS portion 90 will be described below with reference to FIGS. 43 and 44.

The video signal output from frame rate converting portion 80 is delayed in units of pixel in latches 91 and 92, and then input to intraline interpixel weight average calculator 93 along with the video signal output from frame rate converting portion 80. In the calculator, the input is calculated and then output to multiplier 95. The video data output from latches 91 and 92 are input to intraline interpixel weight average calculator 94 and calculated to be output to multiplexer 95.

As shown in FIG. 43, a pixel output from latch 92 and frame rate converting portion 80 is multiplied by ⅔ and ⅓ in ⅔ multiplier 931 and ⅓ multiplier 932, respectively. The multiplication results are summed in adder 933 so that their weight average is calculated and output to multiplexer 95. Pixels output from latches 91 and 92 are multiplied by ⅔ and ⅓ in ⅔ multiplier 941 and ⅓ multiplier 942, respectively. The multiplication results are summed in adder 943 so that their weight average is calculated and output to multiplexer 95.

An externally input reference clock is input to 2-bit counter 98 as its clock so that 3 is counted in total from 0 to 2. The lower bit QA output from 2-bit counter 98 and inverted in inverter 991 is negatively and logically multiplied in NAND gate 992 along with the upper bit QB output from 2-bit counter 98. The result is input to the clear signal input port C1 of 2-bit counter 98 so as to clear it. The signal output from 2-bit counter 98 is as shown in FIG. 44.

According to image formats A–F of the input video signal and display format signal prog, the signal output from HUS bypass controller 96 is input to OR gates 972 and 971 along with the upper and lower bits QB and QA output from 2-bit counter 98 for logical multiplication. The signals output from OR gates 972 and 971 control multiplexer 95's selection and outputs video data.

According to the signals output from OR gates 972 and 971, multiplexer 95 sequentially selects the signals output from adder 933, latch 91, adder 943, and frame rate converting portion 80, so as to output the video data, which is shown in FIG. 44.

The signal output from NAND gate 992 is logically added to the signal output from HUS bypass controller 96 in OR gate 993. This result is output to controller 84 of frame rate converting portion 80 as HUS read enable signal HUS-R, as shown in FIG. 44.

In case that the input video signal is in image format A, B or C and that the display format is interlaced scanning mode, 2:3 up sampling is performed horizontally according to HUS bypass controller 96.

In other words, in case that the input video signal is in image format A, B or C and that the display format is interlaced scanning mode, HUS read enable signal HUS-R is input to controller 84. In this condition, if the signal is in LOW level, more output data must be formed, without video data being read out from FIFO memories 81 and 82 of frame rate converting portion 80 in order to completely perform 2:3 up sampling.

In other cases that the image format is A, B or C and that the display format is the sequential scanning mode, or in case that the image format is D, E or F, up sampling is not performed according to HUS bypass controller 96, and the signal is output from latch 92 through multiplexer 95 without change.

As described above, the present invention converts the image format of a video signal using a single clock, preventing noise caused due to interference between clocks, and reducing the load of an apparatus for generating a clock.

What is claimed is:

1. An image format converter for an HDTV comprising:

a decoder for decoding transmitted data to thereby output video data, image format information, picture structure information, an input frequency sync signal, an input vertical sync signal, and an input line sync signal;

a sync signal generator for outputs a display line sync signal, display vertical sync signal, process line sync signal, and process vertical sync signal, according to an input image format and display image format, using the image format information and the input frequency sync signal output from said decoder, a display format signal externally input in accordance with a display format and an externally input reference clock; and a format converter for converting an input video signal into a sequential scanning mode of 60 Hz frame rate or an interlaced scanning mode of 60 Hz frame rate, using information values output from said decoder and sync signal generator.

2. An image format converter for an HDTV as claimed in claim 1, wherein said format converter comprises:

a blanking area converter for receiving the video data, the image format information and the picture structure information output from said decoder, using said process line sync signal and process vertical sync signal output from said sync signal generator, to thereby convert a blanking area of an image format;

an IPC portion for converting the video signal output from said blanking area converter into a video signal of a sequential scanning mode, according to said process line sync signal output from said sync signal generator and the image format and the display format output from said decoder;

a VDS portion for vertically sampling down the video signal output from said IPC portion by 3:2 in order to convert it into a corresponding image format information, using said process line sync signal output from said sync signal generator and the image format information output from said decoder;

a PIC portion for converting the video signal output from said IPC portion into a video signal of interlaced scanning mode, according to said process line sync signal output from said sync signal generator and the image format output from said decoder;

a first multiplexer for selecting and outputting one of the video signals output from said VDS portion and IPC portion according to a display format;

an HDS portion for horizontally sampling down the video signal output from said first multiplexer by 3:2 in order to convert it into a corresponding image format information, according to the image format and the display format information output from said decoder;

a frame rate converter for converting the frame rate of the video signal output from said HDS portion into 60 Hz according to the image format and the display format output from said decoder, using said process line sync signal, process vertical sync signal, display line sync signal, and display vertical sync signal output from said sync signal generator, and control signals output from said VDS portion, PIC portion, and HDS portion; and an HUS portion for horizontally sampling up the video signal output from said frame rate converter according to the display format.

3. An image format converter for an HDTV as claimed in claim 1, wherein the video signal output from said decoder is made up of an active area and blanking area.

4. An image format converter for an HDTV as claimed in claim 1, wherein the video signal output from said decoder is formed in an image format of 787/788 lines×1600 pixels, 787/788 lines×3200 pixels, 787/788 lines×4000 pixels, 562/563 lines×2240 pixels, 1125 lines×2240 pixels, or 1125 lines×2280 pixels.

5. An image format converter for an HDTV as claimed in claim 1, wherein a blanking area converter converts a video signal of an image format of 562/563 lines×2240 pixels into a video signal of an image format of 1125 lines×2240 pixels.

6. An image format converter for an HDTV as claimed in claim 5, wherein the video signal of an image format of 1125 lines×2240 pixels contains an active area of 1080 lines× 1920 pixels.

7. An image format converter for an HDTV as claimed in claim 1, wherein a blanking area converter converts a video signal of an image format of 1125 lines×2280 pixels into a video signal of an image format of 1125/1687/1688 lines× 2240 pixels.

8. An image format converter for an HDTV as claimed in claim 7, wherein the video signal of an image format of 1125/1687/1688 lines×2240 pixels contains an active area of 1080 lines×1920 pixels.

9. An image format converter for an HDTV as claimed in claim 1, wherein said input frequency sync signal has four times the frequency of said input vertical sync signal.

10. An image format converter for an HDTV as claimed in claim 1, wherein said sync signal generator comprises:

a 1600 line sync signal generator for generating a 1600 line sync signal using an externally input reference clock;

a 2240 line sync signal generator for generating a 2240 line sync signal using the externally input reference clock;

a second multiplexer for selecting one of the line sync signals output from said 1600 line sync signal generator and 2240 line sync signal generator according to the display format, and outputting a display line sync signal;

a 787/788 display vertical sync signal generator for generating a 787/788 display vertical sync signal using the signal output from said 1600 line sync signal generator;

a 562/563 display vertical sync signal generator for generating a 562/563 display vertical sync signal using the signal output from said 2240 line sync signal generator;

a third multiplexer for selecting one of the display vertical sync signals output from said 787/788 display vertical sync signal generator and 562/563 display vertical sync signal generator according to the display format, and outputting a display vertical sync signal;

a 720/1080 line selector for deciding whether the current signal is a 720 line signal or 1080 line signal according to the image format output from said decoder;

a fourth multiplexer for selecting one of the 1600 and 2240 line sync signals output from said 1600 line sync signal generator and 2240 line sync signal generator, and outputting a process line sync signal;

a 720 process vertical sync signal generator for generating a 720 process vertical sync signal using the 787/788 display vertical sync signal output from said 787/788 display vertical sync signal generator according to the image format information output from said decoder;

a 1080 process vertical sync signal generator for generating a 1080 process vertical sync signal using the 562/563 display vertical sync signal output from said 562/563 display vertical sync signal generator according to the image format information output from said decoder;

a fifth multiplexer for selecting one of the 720 and 1080 process vertical sync signals output from said 720 process vertical sync signal generator and 1080 process vertical sync signal generator, and outputting a process vertical sync signal; and a reset controller for detecting the rising edge of the input frequency sync signal output from said decoder, and resetting said 1600 line sync signal generator, 2240 line sync signal generator, 787/788 display vertical sync signal generator, 562/563 display vertical sync signal generator, 720 process vertical sync signal generator, and 1080 process vertical sync signal generator.

11. An image format converter for an HDTV as claimed in claim 10, wherein the 1600 line sync signal of said 1600 line sync signal generator indicates an active area while 1280 reference clocks are produced.

12. An image format converter for an HDTV as claimed in claim 10, wherein the 2240 line sync signal of said 2240 line sync signal generator indicates an active area while 1920 reference clocks are produced.

13. An image format converter for an HDTV as claimed in claim 10, wherein the 787/788 display vertical sync signal of said 787/788 display vertical sync signal generator indicates an active area while 720/1600 line sync signals are produced.

14. An image format converter for an HDTV as claimed in claim 10, wherein the 562/563 display vertical sync signal of said 562/563 display vertical sync signal generator indicates an active area while 540/2240 line sync signals are produced.

15. An image format converter for an HDTV as claimed in claim 10, wherein said 1600 line sync signal generator comprises:

a 11-bit counter for counting an externally input reference clock;

a first comparator for comparing the signal output from said 11-bit counter with 1600;

an OR gate for logically summing the signal output from said comparator and a reset signal output from said reset controller, and outputting the result to said 11-bit counter as a clear input;

a second comparator for comparing the signal output from said 11-bit counter with 0;

a third comparator for comparing the signal output from said 11-bit counter with 1280; and a flipflop for receiving the signal output from said second comparator as a set input, the signal output from said third comparator as a reset input, and the externally input reference clock as the clear input, and outputting the 1600 line sync signal.

16. An image format converter for an HDTV as claimed in claim 10, wherein said 2240 line sync signal generator comprises:

a 12-bit counter for counting an externally input reference clock;

a first comparator for comparing the signal output from said 12-bit counter with 2240;

an OR gate for logically summing the signal output from said first comparator and a reset signal output from said reset controller, and inputting the result to said 12-bit counter as a clear input;

a second comparator for comparing the signal output from said 12-bit counter with 0;

a third comparator for comparing the signal output from said 12-bit counter with 1920; and a flipflop for receiving the signal output from said second comparator as a set input, the signal output from said third comparator as the reset input, and the externally input reference clock as a clear input, and outputting the 2400 line sync signal.

17. An image format converter for an HDTV as claimed in claim 10, wherein said 787/788 display vertical sync signal generator comprises:

a 11-bit counter for counting the 1600 line sync signal output from said 1600 line sync signal generator;

a first comparator for comparing the signal output from said 11-bit counter with 1575;

a first OR gate for logically summing the signal output from said first comparator and a reset signal output from said reset controller, and inputting the result to said 11-bit counter as a clear input;

a second comparator for comparing the signal output from said 11-bit counter 131 with 0;

a third comparator for comparing the signal output from said 11-bit counter with 787;

a fourth comparator for comparing the signal output from said 11-bit counter with 720;

a fifth comparator for comparing the signal output from said 11-bit counter with 1507;

a second OR gate for logically summing the signals output from said second and third comparators;

a third OR gate for logically summing the signals output from said fourth and fifth comparators; and a flipflop for receiving the signal output from said second OR gate as a set input, the signal output from said third OR gate as a reset input, and the 1600 line sync signal output from said 1600 line sync signal generator as the clock input, and outputting the 787/788 display vertical sync signal.

18. An image format converter for an HDTV as claimed in claim 10, wherein said 562/563 display vertical sync signal generator comprises:

a 11-bit counter for counting the 2240 line sync signal output from said 2240 line sync signal generator;

a first comparator for comparing the signal output from said 11-bit counter with 1125;

a first OR gate for logically summing the signal output from said first comparator and a reset signal output from said reset controller, and inputting the result to said 11-bit counter as a clear input;

a second comparator for comparing the signal output from said 11-bit counter with 0;

a third comparator for comparing the signal output from said 11-bit counter with 562;

a fourth comparator for comparing the signal output from said 11-bit counter with 540;

a fifth comparator for comparing the signal output from said 11-bit counter with 1102;

a second OR gate for logically summing the signals output from said second and third comparators;

a third OR gate for logically summing the signals output from said fourth and fifth comparators; and a flipflop for receiving the signal output from said second OR gate as a set input, the signal output from said third OR gate as a reset input, and the 2240 line sync signal output from said 2240 line sync signal generator as a clock input, and outputting the 562/563 display vertical sync signal.

19. An image format converter for an HDTV as claimed in claim 10, wherein said 720 process vertical sync signal generator comprises:

a 4-bit counter for counting the 787/788 display vertical sync signal output from said 787/788 display vertical sync signal generator;

a 720 masking portion for 720 masking the signal output from said 4-bit counter according to the image format information output from said decoder; and an AND gate for logically multiplying the 787/788 display vertical sync signal output from said 787/788 display vertical sync signal generator and the signal output from said 720 masking portion.

20. An image format converter for an HDTV as claimed in claim 17, wherein a 4-bit counter counts only from 0 to 9.

21. An image format converter for an HDTV as claimed in claim 10, wherein said 1080 process vertical sync signal generator comprises:

a 4-bit counter for receiving a reset signal output from said 720/1080 reset controller as a clear input, and counting the 562/563 display vertical sync signal output from said 562/563 display vertical sync signal generator;

a latch for latching the signal output from said 4-bit counter according to the externally input reference clock;

a 1080 masking portion for receiving the image format information output from said decoder and the output signal of said 4-bit counter, to thereby output a 1080 masking signal;

a 1080 clear masking portion for receiving the image format information output from said decoder and the output signal of said latch to thereby output a 1080 clear masking signal;

a rising edge detector for detecting the rising edge of the 562/563 display vertical sync signal output from said 562/563 display vertical sync signal generator;

an AND gate for logically multiplying the signals output from said 1080 clear masking portion and rising edge detector;

a 11-bit counter for counting the 2240 line sync signal output from said 2240 line sync signal generator 120;

a first comparator for comparing the signal output from said 11-bit counter with 1125;

an OR gate for logically summing the signal output from said first comparator and the signal output from said AND gate, and inputting the result to said 11-bit counter as the clear input;

a second comparator for comparing the signal output from said 11-bit counter with 0;

a third comparator for comparing the signal output from said 11-bit counter with 1080;

a flipflop for receiving the signal output from said second comparator as a set input, the signal output from said third comparator as a reset input, and the 2240 line sync signal output from said 2240 line sync signal generator as a clock input; and an AND gate for logically multiplying the signals output from said 1080 masking portion and flipflop.

22. An image format converter for an HDTV as claimed in claim 21, wherein said 4-bit counter counts only from 0 to 9.

23. An image format converter for an HDTV as claimed in claim 2, wherein said blanking area converter comprises:

a first FIFO memory for temporarily storing data corresponding to the top field out of the video data output from said decoder;

a second FIFO memory for temporarily storing data corresponding to the bottom field out of the video data output from said decoder;

a second multiplexer for multiplexing the signals output from said first and second FIFO memories, and outputting the result to said IPC portion; and a controller for receiving the image format information and picture structure information output from said decoder to thereby control said first and second FIFO memories and multiplexer, using said process line sync signal and process vertical sync signal output from said sync signal generator.

24. An image format converter for an HDTV as claimed in claim 23, wherein said first FIFO memory is used only when the display format is a sequential scanning mode.

25. An image format converter for an HDTV as claimed in claim 23, wherein said controller comprises:

a first rising edge detector for detecting the rising edge of the input vertical sync signal output from said decoder, and outputting top and bottom FIFO write reset signals;

a FIFO write masking portion for processing write masking, using the image format information and picture structure information output from said decoder;

a write enable signal generator for outputting top and bottom FIFO write enable signals for controlling the writing of said first and second FIFOs using the input vertical sync signal and the input line sync signal output from said decoder and the signal output from said FIFO write masking portion;

a second rising edge detector for detecting the rising edge of the process vertical sync signal output from said sync signal generator, and outputting top and bottom FIFO read reset signals;

a FIFO read masking portion for processing read masking according to the image format information output from said decoder; and a read enable signal generator for outputting top and bottom FIFO read enable signals for controlling the reading of said FIFOs and the selection signal for controlling said second multiplexer, using the process vertical sync signal and the process line sync signal output from said sync signal generator and the signal output from said FIFO read masking portion.

26. An image format converter for an HDTV as claimed in claim 25, wherein said write enable signal generator comprises:

a first AND gate for logically multiplying the input vertical sync signal and the input line sync signal output from said decoder;

a flipflop for taking the input line sync signal output from said decoder as a clock input;

an inverter for inverting the signal output from said flipflop;

a second AND gate for logically multiplying the signal output from said flipflop and a first output signal output from said FIFO write masking portion;

a third AND gate for logically multiplying the signal output from said inverter and a second output signal output from said FIFO write masking portion;

a first OR gate for logically summing the signal output from said second AND gate and a third output signal output from said FIFO write masking portion;

a second OR gate for logically summing the signal output from said second AND gate and a fourth output signal output from said FIFO write masking portion;

a fourth AND gate for logically multiplying the signals output from said first AND gate and first OR gate, and outputting a top FIFO write enable signal; and a fifth AND gate for logically multiplying the signals output from said first AND gate and second OR gate, and outputting a bottom FIFO write enable signal.

27. An image format converter for an HDTV as claimed in claim 25, wherein said read enable signal generator comprises:

a first AND gate for logically multiplying the process vertical sync signal and the process line sync signal output from said sync signal generator;

a flipflop for taking the process vertical sync signal output from said sync signal generator as a clock input;

an OR gate for logically summing the signals output from said flipflop and the FIFO read masking portion;

an inverter for inverting the signal output from said OR gate;

a second AND gate for logically multiplying the signals output from said first AND gate and the OR gate; and a third AND gate for logically multiplying the signals output from said first AND gate and the inverter.

28. An image format converter for an HDTV as claimed in claim 2, wherein said IPC portion comprises:

a first line delay for delaying the video signal output from a blanking converter in units of line;

a second line delay for delaying the video signal output from said first line delay in units of line;

a median filter for median-filtering the video signal output from a blanking converter and first and second line delays;

an IPC bypass controller for controlling the IPC bypass of the video signal output from a blanking converter according to the image format information and then display format output from said decoder;

a flipflop for taking the process line sync signal output from said sync signal generator as a clock input and to an input port of which power is coupled;

an OR gate for logically summing the signals output from said IPC bypass controller and the flipflop; and a second multiplexer for selecting and outputting the video signals output from said first line delay and the median filter under the control of the signal output from said OR gate.

29. An image format converter for an HDTV as claimed in claim 2, wherein said VDS portion vertically samples down the video signal output from said IPC by 3:2.

30. An image format converter for an HDTV as claimed in claim 29, wherein said VDS portion comprises:
   a line delay for delaying the video signal output from said IPC portion in units of line;
   an interline pixel average calculator for calculating the average of the video signals output from said IPC portion and the line delay;
   a second multiplexer for selecting and outputting one of the signals output from said line delay, the interline pixel average calculator, and a ground;
   a VDS bypass controller for controlling VDS bypass according to the image format information output from said decoder;
   a 2-bit counter for counting the process line sync signal output from said sync signal generator;
   a multiplexer controller for controlling said second multiplexer according to the 2-bit signals output from said VDS bypass controller and the 2-bit counter;
   a NAND gate for logically multiplying an upper bit signal output from said 2-bit counter and an inverted lower-bit signal, and outputting the result to a clear port of said 2-bit counter; and
   an OR gate for logically summing the signals output from said VDS bypass controller and the NAND gate, and outputting a VDS read enable signal to said frame rate converter.

31. An image format converter for an HDTV as claimed in claim 30, wherein said interline pixel average calculator comprises:
   an adder for adding the video signals output from said IPC portion and the line delay; and
   a ½ multiplier for multiplying the signal output from said adder by ½.

32. An image format converter for an HDTV as claimed in claim 30, said multiplexer controller comprises:
   an inverter for inverting the signal output from said VDS bypass controller;
   a first AND gate for logically multiplying the upper-bit signal output from said 2-bit counter and the signal output from said inverter; and
   a second AND gate for logically multiplying the lower-bit signal output from said 2-bit counter and the signal output from an inverter 433.

33. An image format converter for an HDTV as claimed in claim 2, said PIC portion comprises:
   a line delay for delaying the video signal output from said IPC portion in units of line;
   a first interline pixel weight average calculator for multiplying the video signal output from said PIC portion and the line delay by a corresponding weight to thereby calculate its weight average;
   a second interline pixel weight average calculator for multiplying the video signal output from said PIC portion and the line delay by a corresponding weight to thereby calculate its weight average;
   a second multiplexer for selecting and outputting one of the signals output from said line delay, an interline pixel weight average calculator, and a ground;
   a PIC bypass controller for controlling PIC bypass according to the image format information output from said decoder;
   a 2-bit counter for counting the process line sync signal output from said sync signal generator;
   a second multiplexer controller for outputting a signal for controlling said second multiplexer, using the signals output from said PIC bypass controller and the 2-bit counter;
   a third multiplexer for selecting and outputting one of the signals output from said line delay, an interline pixel weight average calculator, and a ground;
   a third multiplexer controller for outputting a signal for controlling said third multiplexer, using the signals output from said PIC bypass controller and the 2-bit counter; and
   a write enable signal generator for generating top and bottom PIC write enable signals, and outputting them to said frame rate converter, using the signals output from said 2-bit counter and the PIC bypass controller.

34. An image format converter for an HDTV as claimed in claim 33, wherein an interline pixel weight average calculator comprises:
   a ⅓ multiplier for multiplying the signal output from said IPC portion by ⅓;
   a ⅔ multiplier for multiplying the signal output from said line delay by ⅔; and
   an adder for adding the video signals output from said ⅓ multiplier and ⅔ multiplier.

35. An image format converter for an HDTV as claimed in claim 33, wherein an interline pixel weight average calculator comprises:
   a ⅔ multiplier for multiplying the signal output from said IPC portion by ⅔;
   a ⅓ multiplier for multiplying the signal output from said line delay by ⅓; and
   an adder for adding the video signals output from said ⅔ multiplier and ⅓ multiplier.

36. An image format converter for an HDTV as claimed in claim 33, a multiplexer controller comprises:
   an inverter for inverting the signal output from said PIC bypass controller;
   a first AND gate for logically multiplying the signal output from said inverter by an upper-bit signal output from said 2-bit counter; and
   a second AND gate for logically multiplying the signal output from said inverter by a lower-bit signal output from said 2-bit counter.

37. An image format converter for an HDTV as claimed in claim 33, wherein a multiplexer controller comprises:
   an OR gate for logically summing the signal output from said PIC bypass controller and an upper-bit signal output from said 2-bit counter; and
   an AND gate for inverting the signal output from said PIC bypass controller and logically multiplying the signal by a lower-bit signal output from said 2-bit counter.

38. An image format converter for an HDTV as claimed in claim 33, said write enable signal generator comprises:
   a first NAND gate for negatively and logically multiplying an upper and lower bit signals output from said 2-bit counter;
   an inverter for inverting the upper-bit signal output from said 2-bit counter;
   a second NAND gate for negatively and logically multiplying the lower bit signal output from said 2-bit counter and the signal output from said inverter;
   a first OR gate for logically summing the signal output from said PIC bypass controller and the signal output from said first NAND gate, and outputting the result as a top PIC write enable signal; and a second OR gate for logically summing the signal output from said PIC bypass controller and the signal output from said second NAND gate, and outputting the result as a bottom PIC write enable signal.

39. An image format converter for an HDTV as claimed in claim 2, wherein said HDS portion horizontally samples down the video signal output from said first multiplexer by 3:2.

40. An image format converter for an HDTV as claimed in claim 39, wherein said HDS portion 70 comprises:

a latch for delaying the video signal output from said first multiplexer in units of pixel;

an intraline interpixel average calculator for calculating the average of the video signals output from said first multiplexer and the latch;

a second multiplexer for selecting and outputting one of the signals output from said latch, the intraline interpixel average calculator, and a ground;

an HDS bypass controller for controlling HDS bypass according to the image format information and the display format output from said decoder;

a second multiplexer controller for controlling said second multiplexer, using the signal output from said HDS bypass controller;

a 2-bit counter for counting a reference clock;

a first inverter for inverting a lower-bit signal output from said 2-bit counter;

a first NAND gate for logically multiplying the signal output from said first inverter and an upper bit signal output from said 2-bit counter, and outputting the result to a clear signal input port of said 2-bit counter; and an OR gate for logically summing the signals output from said HDS bypass controller and NAND gate, and outputting a HDS write enable signal to said frame rate converter.

41. An image format converter for an HDTV as claimed in claim 40, wherein said intraline interpixel average calculator comprises:

an adder for adding the signals output from said first multiplexer and the latch; and a ½ multiplier for multiplying the signal output from said adder by ½.

42. An image format converter for an HDTV as claimed in claim 2, wherein said frame rate converter comprises:

a first FIFO memory for temporarily storing data corresponding to a top field out of the video data output from said HDS portion;

a second FIFO memory for temporarily storing data corresponding to a bottom field out of the video data output from said HDS portion;

a second multiplexer for multiplexing the signals output from said FIFO memories, and outputting the result to said HUS portion; and a controller for controlling said first and second FIFO memories and multiplexer according to the image format and the display format output from said decoder, using the process line sync signal, the process vertical sync signal, the display line sync signal, and the display vertical sync signal output from said sync signal generator, and the control signals output from said VDS portion, the PIC portion, and the HDS portion.

43. An image format converter for an HDTV as claimed in claim 42, wherein said first FIFO memory is used only when the display format is sequential scanning mode.

44. An image format converter for an HDTV as claimed in claim 42, wherein said controller comprises:

a first rising edge detector for detecting the rising edge of the process vertical sync signal output from said sync signal generator, and outputting top and bottom FIFO write reset signals;

a write enable signal generator for outputting top and bottom FIFO write enable signals for controlling the writing of said first and second FIFO memories according to the display format, using the process vertical sync signal and the process line sync signal output from said sync signal generator, top and bottom PIC write enable signals output from said PIC portion, VDS write enable signal output from said VDS portion, and HDS write enable signal output from said HDS portion;

a second rising edge detector for detecting the rising edge of the display vertical sync signal output from said sync signal generator, and outputting top and bottom FIFO read reset signals; and a read enable signal generator for outputting top and bottom FIFO read enable signals for controlling the reading of said first and second FIFOs and a selection signal for controlling said second multiplexer, using the display vertical sync signal and display line sync signal output from said sync signal generator and the control signal output from said HUS portion.

45. An image format converter for an HDTV as claimed in claim 44, wherein said write enable signal generator comprises:

a two-line delay for two-line delaying the process vertical sync signal output from said sync signal generator;

a first AND gate for logically multiplying the process line sync signals output from said two-line delay and the sync signal generator;

a third multiplexer for selecting and outputting one of the PIC write enable signal output from said PIC portion and the VDS write enable signal output from said VDS portion according to the display format;

a second AND gate for logically multiplying the signals output from said first AND gate and second multiplexer;

a latch for latching the signal output from said second AND gate;

a third AND gate for logically multiplying the HDS write enable signal output from said HDS portion and the signal output from said latch, and outputting top FIFO write enable signal;

an inverter for inverting the a sequential scanning signal indicative of the display format;

a fourth AND gate for logically multiplying bottom PIC write control signal output from said the PIC portion and the signal output from said inverter; and a fifth AND gate for logically multiplying the signals output from said first and the fourth AND gates, and outputting the bottom FIFO write enable signal.

46. An image format converter for an HDTV as claimed in claim 44, wherein said read enable signal generator comprises:

a flipflop for taking display vertical sync signal output from said sync signal generator as its clock input;

an OR gate for logically summing the signal output from said flipflop and a sequential scanning signal indicative of the display format;

an inverter for inverting the signal output from said OR gate;

a first AND gate for logically multiplying the display vertical sync signal output from said sync signal generator and the display line sync signal;

a second AND gate for logically multiplying the control signal output from said HUS portion and the signal output from said first AND gate;

a third AND gate for logically multiplying the signals output from said OR gate and second AND gate, and outputting a selection signal for controlling said second multiplexer and the top FIFO read enable signal; and a fourth AND gate for logically multiplying the signals output from said inverter and second AND gate, and outputting the bottom FIFO read enable signal.

47. An image format converter for an HDTV as claimed in claim 2, wherein said HUS portion performs horizontal 2:3 up sampling.

48. An image format converter for an HDTV as claimed in claim 47, wherein said HUS portion comprises:

a first latch for delaying the video signal output from said frame rate converter in units of pixel;

a second latch for delaying the video signal output from said first latch in units of pixel;

a first intraline interpixel weight average calculator for multiplying the video signals output from said frame rate converter and second latch by a corresponding weight to thereby calculate its weight average;

a second intraline interpixel weight average calculator for multiplying the video signals output from said first and the second latches by a corresponding weight to thereby calculate its weight average;

a second multiplexer for selecting and outputting one of an input data, and the signals output from said the first latch, first and second intraline interpixel weight average calculator, and the frame rate converter;

a HUS bypass controller for controlling HUS bypass according to the image format information and the display format output from said decoder;

a 2-bit counter for counting an input reference clock;

a second multiplexer controller for outputting a selection signal for controlling said second multiplexer, using the signals output from said HUS bypass controller and 2-bit counter; and a HUS read enable signal generator for generating a HUS read enable signal and outputting the result to said frame rate converter, using the signals output from said HUS bypass controller and the 2-bit counter.

49. An image format converter for an HDTV as claimed in claim 48, wherein said first intraline interpixel weight average calculator comprises:

a $2/3$ multiplier for multiplying the signal output from said second latch by $2/3$;

a $1/3$ multiplier for multiplying the video signal output from said frame rate converter by $1/3$; and an adder for adding the signals output from said $2/3$ multiplier and the $1/3$ multiplier, and outputting the result to said multiplexer.

50. An image format converter for an HDTV as claimed in claim 48, wherein said second intraline interpixel weight average calculator comprises:

a $2/3$ multiplier for multiplying the video signal output from said first latch by $2/3$;

a $1/3$ multiplier for multiplying the video signal output from said latch by $1/3$; and an adder for adding the signal output from said $1/3$ multiplier and said $2/3$ multiplier, and outputting the result to said first multiplexer.

51. An image format converter for an HDTV as claimed in claim 48, wherein said second multiplexer controller comprises:

a first OR gate for logically summing the signal output from said HUS bypass controller and a lower-bit signal output from said 2-bit counter; and a second OR gate for logically multiplying the signal output from said HUS bypass controller by an upper-bit signal output from said 2-bit counter.

52. An image format converter for an HDTV as claimed in claim 48, wherein said HUS read enable signal generator comprises:

an inverter for inverting a lower-bit signal output from said 2-bit counter;

a NAND gate for negatively and logically multiplying an upper and lower bit signals output from said 2-bit counter; and an OR gate for logically summing the signals output from said NAND gate and HUS bypass controller.

* * * * *